(12) United States Patent
Quaresma et al.

(10) Patent No.: US 11,736,609 B2
(45) Date of Patent: Aug. 22, 2023

(54) SYSTEMS AND METHODS OF AUTOMATED VALIDATION OF ELECTRONIC DATA VIA A USER INTERFACE

(71) Applicant: JoshCo Tech, LLC, Las Vegas, NV (US)

(72) Inventors: Brian C. Quaresma, Las Vegas, NV (US); Frederick Robert De Yong, Henderson, NV (US); Preston Spencer Ramirez, Las Vegas, NV (US); Joshua James Smith, Henderson, NV (US)

(73) Assignee: JoshCo Group, LLC, Las Vegas, NV (US)

( * ) Notice: Subject to any disclaimer, the term of this patent is extended or adjusted under 35 U.S.C. 154(b) by 213 days.

(21) Appl. No.: 17/182,110

(22) Filed: Feb. 22, 2021

(65) Prior Publication Data

US 2022/0272195 A1 Aug. 25, 2022

(51) Int. Cl.
*H04M 3/493* (2006.01)
*H04M 3/51* (2006.01)
(Continued)

(52) U.S. Cl.
CPC ............ *H04M 3/493* (2013.01); *G06F 3/167* (2013.01); *G10L 15/22* (2013.01);
(Continued)

(58) Field of Classification Search
CPC ............... H04M 3/493; H04M 3/5166; H04M 2201/40; H04M 2201/42; H04M 2250/60;
(Continued)

(56) References Cited

U.S. PATENT DOCUMENTS 5,822,405 A * 10/1998 Astarabadi ............ H04M 3/533
379/88.04
6,192,314 B1 * 2/2001 Khavakh ............ G01C 21/3492
701/410

(Continued)

OTHER PUBLICATIONS

Voiq, Bot-to-Bot Conversations Navigating IVRs, https://www.voiq.com/voicebots/solutions/bot-to-bot, Feb. 10, 2021, 6 pages.

*Primary Examiner* — Lisa Hashem
(74) *Attorney, Agent, or Firm* — Dinsmore & Shohl LLP

(57) ABSTRACT

Certain aspects of the present disclosure provide a system for obtaining electronic data from a network server accessible. The system comprises a communication device to electronically access an automated phone system via a telephone number and a memory circuit that stores a configuration file and a log file. The system further comprises a processor that identifies a record that includes a unique identifier for an entity and data to compare with corresponding data from the automated phone system. The processor is further configured to access and navigate the phone menu based on the configuration file and input a unique sequence of digits based on the instructions in the configuration file. The processor is also configured to obtain an audio message from the automated phone system, convert the audio message to a corresponding text message, and determine whether the corresponding text message indicates an error or includes the corresponding data.

20 Claims, 11 Drawing Sheets

(51) Int. Cl.
   *G10L 15/22* (2006.01)
   *G06F 3/16* (2006.01)
(52) U.S. Cl.
   CPC ..... *H04M 3/5166* (2013.01); *G10L 2015/223* (2013.01); *G10L 2015/225* (2013.01); *H04M 2201/40* (2013.01); *H04M 2201/42* (2013.01); *H04M 2250/60* (2013.01)
(58) Field of Classification Search
   CPC ............... G10L 15/22; G10L 2015/223; G10L 2015/225; G06F 3/167
   See application file for complete search history.

(56) References Cited

U.S. PATENT DOCUMENTS

| | | | |
|---|---|---|---|
| 7,330,538 B2 | 2/2008 | Dunsmuir | |
| 8,155,276 B2* | 4/2012 | Beauregard | H04M 3/493 379/74 |
| 8,254,534 B2* | 8/2012 | Comerford | H04M 3/493 379/85 |
| 9,031,214 B2 | 5/2015 | Dahan | |
| 9,420,097 B2 | 8/2016 | Perotti et al. | |
| 9,659,062 B1* | 5/2017 | Kapoor | G06F 16/24564 |
| 9,936,073 B2 | 4/2018 | Sasidharan et al. | |
| 10,091,356 B2 | 10/2018 | Kulkarni et al. | |
| 10,580,079 B1* | 3/2020 | Chen | H04M 3/493 |
| 10,659,608 B2 | 5/2020 | Lin | |
| 11,086,958 B2* | 8/2021 | Levi | G06F 3/0482 |
| 2001/0049671 A1* | 12/2001 | Joerg | G06F 16/951 706/50 |
| 2020/0126137 A1* | 4/2020 | Pilkington | G16H 10/00 |
| 2020/0388402 A1* | 12/2020 | Frey | G06F 16/9537 |
| 2022/0392453 A1* | 12/2022 | Gupta | G10L 17/12 |
| 2022/0392622 A1* | 12/2022 | Kotiyar | G16H 10/60 |
| 2022/0405854 A1* | 12/2022 | Rugel | G06Q 40/08 |

* cited by examiner

SYSTEMS AND METHODS OF AUTOMATED VALIDATION OF ELECTRONIC DATA VIA A USER INTERFACE

INTRODUCTION

Aspects of the present disclosure relate to systems and methods of dynamically and automatically accessing and navigating user interfaces provided by electronically connected servers to access data at the servers.

Many client-facing systems utilize user interfaces to enable clients to access relevant information. In some aspects, each client may have a unique identifier with which the systems associate the relevant information. The systems may employ the user interfaces to reduce costs for having live attendants available to answer calls and provide information that is stored in a database. Thus, the user interfaces may save costs for companies that operate the systems.

However, while costs may be saved for the companies operating the systems, clients accessing such systems may spend large amounts of time navigating the user interfaces. For example, when the systems utilize automated phone systems as the user interfaces, the clients must spend time accessing the phone systems (for example, by dialing the corresponding phone number), listening to recorded prompts, listening to instructions or options for response, entering responses, and otherwise navigating the phone systems. Based on the complexity of the phone systems, such a process can take the client many minutes to access the systems and obtaining the client's data from the server. For entities that handle accessing the systems for a large number of clients, the process of manually accessing the systems and spending many minutes navigating the systems to obtain the client's data from the server for each client with employees and operators can be inefficient and costly.

For example, a few industries that utilize user interfaces in which the above problems exist include healthcare (for example, where patient clients access user interfaces through which they can access health and/or billing information, review and/or schedule appointments, update information, and so forth), government agencies (for example, where citizen user access systems user interfaces through which they can access governmental records, respond to inquiries, review and/or schedule appointments, and so forth), travel (for example, where customer users access user interfaces through which they can schedule, review, and/or change travel plans, update contact information, and so forth), insurance (for example, where customer users access systems through which they can review and/or update claims, request and/or update insurance coverage, and so forth), financial industries (for example, where customer users access systems through which they can review account information, request information, open accounts, apply for products, and so forth), and the like. Of course, the inventive subject matter is not specific to any one industry described herein and could benefit any other industry in which automated user interfaces are used by clients or users to access, input, and/or update standardized information (for example, information stored in a given format, and so forth) for which human interaction is not needed and may not be desired.

Thus, there is a need for improved systems and methods for accessing automated user interfaces and obtaining data from the user interfaces after navigating corresponding menus and/or options, and the present disclosure is directed toward overcoming one or more of the problems identified above and herein and/or providing advantages over prior systems.

BRIEF SUMMARY

A system for obtaining electronic data from a server accessible via a telecommunications network is disclosed herein. The system comprises a communication device, a memory circuit, and a processor. The communications device is configured to electronically access an automated phone system via the telecommunications network using a telephone number. The memory circuit is configured to store a configuration file and a log file. The configuration file comprises instructions for electronically navigating a phone menu of the automated phone system, and the log file comprises details of transactions (positive and negative results) with the automated phone system. The processor is configured to identify a record corresponding to an entity, where the record includes a unique identifier for the entity and data to be compared with corresponding data accessible via the automated phone system. The processor is further configured to access the phone menu of the automated phone system via the communication device using the telephone number and navigate the phone menu based on the configuration file and via the communication device. The processor is also configured to input, via the communication device, a unique sequence of digits corresponding to the unique identifier in response to a prompt for the unique identifier from the automated phone system and based on the instructions in the configuration file and obtain an audio message from the automated phone system in response to the input of the unique sequence of digits. The processor is additionally configured to convert the audio message to a corresponding text message, determine that the corresponding text message includes the corresponding data, update the identified record with the corresponding text message based on a determination that the corresponding text message includes the corresponding data, and update the log file based on the determination that the corresponding text message includes the corresponding data.

In another aspect, a method of obtaining electronic data is disclosed. The method comprises accessing a client file that comprises a plurality of client records for a plurality of entities for whom respective data in the respective client record is compared to corresponding data from a server and accessing a configuration file comprising instructions for electronically navigating an automated user interface for the server to access the corresponding data for the plurality of entities. The method also comprises identifying a record corresponding to one of the plurality of entities, where the record includes a unique identifier for the entity and the data to be compared with the corresponding data accessed via the automated user interface, and navigating the automated user interface based on the instructions of the configuration file via a communication device. The method further comprises inputting the unique identifier in response to a prompt for the unique identifier from the automated user interface via the communication device and determining that a message received in response to the input of the unique identifier indicates an error accessing the corresponding data via the automated user interface or includes the data. The method additionally comprises updating the record for the entity with the corresponding data based on a determination that the message includes the corresponding data and updating a log file based on the determination that the message includes the corresponding data.

In another aspect, another system for obtaining electronic data from a server accessible via a telecommunications network is disclosed. The system comprises a communication device, a memory circuit, and a processor. The communication device is configured to electronically access an automated user interface via the telecommunications network using a communication identifier. The memory circuit is configured to store a log file comprising details of transactions with the automated user interface and a plurality of records corresponding to a plurality of entities, individual records of the plurality of records including a unique identifier for the corresponding entity and data to be compared with corresponding data accessible via the automated user interface. The processor is configured to identify a record from the plurality of records comprising the data for comparison with the corresponding data accessible via the automated user interface, dynamically navigate the automated user interface via the communication device, and automatically input, via the communication device, an alphanumeric sequence of characters representing the unique identifier in response to a prompt for the unique identifier from the automated user interface. The processor is further configured to determine that a message received in response to the input of the alphanumeric sequence of characters includes the corresponding data, update the record for the entity with the corresponding data based on a determination that the message includes the corresponding data, and update a log file based on the determination that the message includes the corresponding data.

Various objects, features, aspects and advantages of the embodiments disclosed herein will become more apparent from the following detailed description of preferred embodiments, along with the accompanying drawing figures in which like numerals represent like components.

The following description and the related drawings set forth in detail certain illustrative features of one or more embodiments.

BRIEF DESCRIPTION OF THE DRAWINGS

Various embodiments disclosed herein are described in detail with reference to the following figures, in which like reference numerals refer to like parts. The figures are provided for purposes of illustration only and merely depict typical or exemplary embodiments. These figures are provided to facilitate the reader's understanding and shall not be considered limiting of the breadth, scope, or applicability of the embodiments. It should be noted that for clarity and ease of illustration these drawings are not necessarily made to scale.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
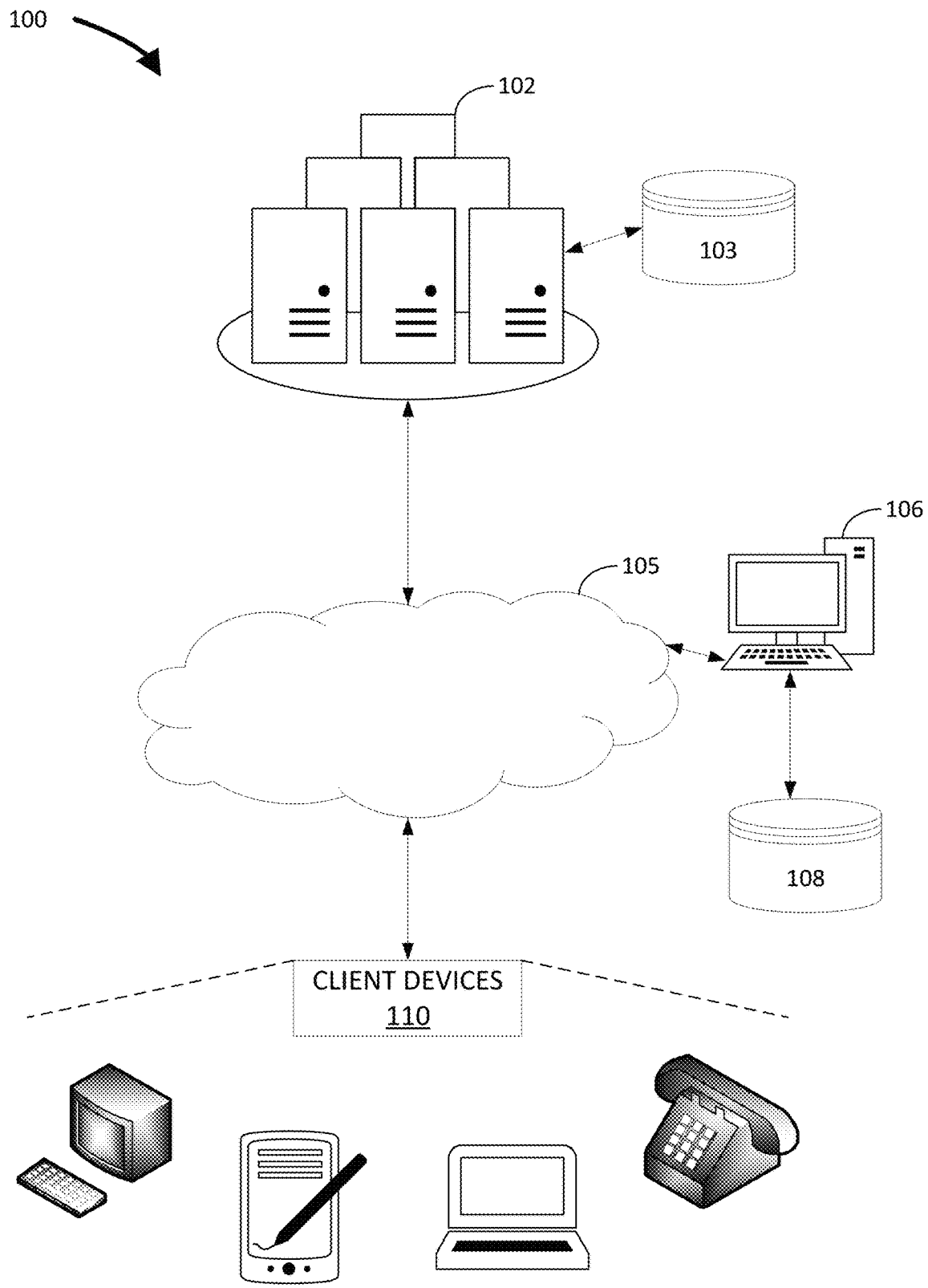
FIG. 1A depicts an example of an architecture of hardware systems and components in which systems and methods described herein are implemented.

Aspects of the present disclosure provide apparatuses, methods, processing systems, and computer-readable mediums for providing automated methods to electronically access electronic user interfaces, navigate the user interfaces, provide a reference identifier to access to client data, obtain the client data via the user interface, and compare the client data accessed via the user interface with local client data.

As introduced above, electronic user interfaces often enable clients to access client data stored on or by company servers. In some instances, these user interfaces are accessible via a computing device, a telephone, and the like. Via these user interfaces, a client is able to navigate through various options and request access to client data stored by the company servers that relates to the client.

For example, a Veteran ("Vet") may obtain disability benefits ("benefits") for medical and similar services and products from the Department of Veterans Affairs ("VA"). The VA may determine that each Vet has access to a certain level of benefits, for example, based on a disability level of the Vet. Over time, the level of benefits for a particular Vet may change (for example, as the Vet's health worsens and additional treatment or care is necessitated or improves and less treatment or care is needed). In some instances, the only way that the Vet can identify the level of benefits or available benefits to which the Vet is entitled is to call the VA and access that information via the VA's automated phone system (for example, an interactive voice response (IVR) system). The Vet can call the VA at a specific phone number, navigate a menu of options, and enter an identifier (for example, a confirmation number associated with the Vet or with a particular procedure or benefits request) to identify whether the Vet's benefit level has changed. The VA can update corresponding information monthly, weekly, or on any other interval, such that the Vet may need to call the VA multiple times to obtain the most accurate information. Furthermore, each Vet may have multiple files (for example, claims) for which the Vet is awaiting a benefits determination and for which updates can only be obtained via calling the VA. For a client representative company that monitors and validates Vet benefits on behalf of a plurality of Vets, the company may telephonically validate each Vet's benefits by calling the VA and accessing the VA's phone menu. This manual process may require between 2 and 5 minutes per Vet. Additionally, the number of files at the VA may vary over time. Thus, when the company monitors and validates Vet records for a large number of Vets, the process of monitoring and validating all of the Vets' records can expend large amounts of time.

With respect to the VA and Vet example, the Vet can access a VA web-based or telephonic user interface to access and validate the Vet's benefits. More specifically, the Vet may have data regarding the Vet's previous benefits and a unique Vet identifier, confirmation number, or other reference identifier and wish to validate whether the Vet client's benefits have changed with respect to an event. The event may comprise a Vet request for an increase in benefits, a health or life event that the Vet experienced, and the like. Navigating the VA's user interface to obtain the Vet's benefits may require the Vet to call the VA's automated voice menu system, navigate a phone menu provided by the automated voice menu system, enter the unique Vet identifier, confirmation number, or other reference identifier when prompted, and await an audio message from the automated voice menu system with the VA's records regarding the Vet's benefits. Once the Vet receives this data from the VA's automated voice menu system, the Vet may compare the received data with the data the Vet had regarding previous benefits and determine whether there has been any change in the Vet's benefits. The process of accessing the VA's automated voice menu system and comparing the received data with the previous data may take the Vet approximately five minutes. Vet benefit service providers, which may provide services to the Vets where the service providers automatically monitor benefits for Vet clients and assist the Vet clients with claims, benefit adjustments, reimbursements, and the like, may utilize the VA's automated voice menu system to access and validate the Vet benefits for thousands of Vets. When accessing and validating the client data takes approximately five minutes per Vet, the time required to access and validate the Vet benefits for all Vets represented by the Vet benefit service provider can be impractical and unfeasible.

Aspects described herein enable the Vet benefit service provider to employ an automated computing device or system ("automated device") to access the VA's automated voice menu system, navigate the corresponding phone menu, and obtain the VA's benefits data (for example, stored by a VA server in a database or similar data store) for each Vet represented by the Vet benefit service provider for comparison with stored benefits data (for example, stored in a Vet benefit service provider's database or similar data store) without manual, or human, involvement. In some embodiments, the Vet benefit service provider can further identify any difference between the stored benefits data and the VA's benefits data and determine whether the difference exceeds a threshold value. The Vet benefit service provider may determine a change in a scope of benefits of the entity when the difference exceeds the threshold value. For example, when the difference between the data exceeds the threshold, the difference in the Vet's benefit data may indicate a change in the Vet's benefits, for example an increase or a decrease to a different benefits level. Additionally, based on such an increase or decrease, the Vet benefit service provider may identify a corresponding value for the Vet benefit service provider. For example, when the Vet's benefit level or amount increases, the Vet may owe the Vet benefit service provider an increased amount or decreased amount, respectively. In some instances, one or more of the identified difference, the determined change, and the service provider value in the database or corresponding data store.

Aspects described herein may integrate various technologies to provide the automated device. For example, the Vet benefits service provider may utilize an automated phone dialing system that employs a configuration file to navigate the phone menu presented by the VA's voice menu system. The configuration file may include instructions for navigating the phone menu without having to process the phone menu each time the automated phone dialing system accesses the VA's voice menu system. For example, the configuration file can include information regarding delays, what values to enter at particular prompts or time in the call, when to provide the Vet's unique identifier or reference number, and when to record an audio response message from the VA's voice menu system that includes the VA's benefits data for the Vet associated with the provided unique identifier or reference number. Alternatively, or additionally, the Vet benefits service provider can employ a natural language processing (NLP) device or service that actively interprets the phone menu when the VA's voice menu system is accessed to obtain update benefits data for the Vet clients.

The automated device employed by the Vet benefits service provider may provide a user interface of its own for operators of the automated device to control and/or monitor the device or system. The Vet benefits service provider may store or maintain records for each Vet ("client records") that include personally identifiable information ("PII") for each Vet, for example, including Name, Social Security number, date of birth, current benefits level or rate, unique identifier, and transaction reference number. The automated device may update the stored records with new information received from the VA. For example, when the automated device accesses the VA's voice menu system and obtains VA data that the Vet's benefit level increased, then the automated device may update the client record for the Vet as stored or maintained by the Vet benefits service provider based on the obtained VA data. Furthermore, the automated device may maintain or update a log file based on each transaction with the VA voice menu system (for example, for each Vet record for which the automated device accesses the VA voice menu system). The log file may track errors and/or transaction records associated with any Vet record for troubleshooting and/or diagnostic review. In brief, and as will be described in further detail below, the automated device may, for each Vet record stored or maintained by the Vet benefits service provider:

Leverage an Internet Protocol ("IP") or web-based telephone system and/or public switched telephone network ("PSTN") to connect to a VA voice menu system and initiate a transaction with the VA server with a phone call.

Navigate a phone menu provided by the VA voice menu system.

Navigate the phone menu using a configuration file.

Navigate the phone menu using NLP.

Employ a method and/or components to access the configuration file and navigate the phone menu via data entry during the phone call.

Employ a method and/or components to identify a Vet's identifier or reference number and benefits data in the Vet records and enter the identifier or reference number into the VA voice menu system.

Record an audio response from the VA voice menu system after entering the identifier or reference number.

Convert the recorded audio response to text.

Determine whether the text converted from the recorded response includes the VA's benefits data for the Vet or error information.

When the recorded response includes the VA's benefits data, compare the VA's benefits data with the benefits data in the Vet's records to determine a change in the Vet's benefits level.

Update the benefits data in the Vet's records based on determination of the change in the Vet's benefits level.

Optionally identify a value to the Vet benefits service provider based on the change in the Vet's benefit level.

Store any of the determined change in benefits level and the identified value.

The examples provided herein focus on accessing a voice menu system user interface for the VA via a phone call to monitor and/or validate Vet benefits. However, it will be understood that the systems, methods, and computer-readable mediums described herein can similarly be used to automatically access, navigate, and obtain information from various types of user interfaces (for example, voice menu systems, web-based user interfaces, graphical user interfaces providing one or more prompts, popups, windows, and the like) via various communications (telephone calls, video calls, Internet communications, web-based transactions, and the like) for various companies and/or industries. The automated device and corresponding systems, methods and computer-readable mediums provide various benefits over existing systems. For example, the automated device enables a reduction in resources (for example, time, manpower, corresponding technology) over the existing systems and provides for prompt identification and updating of data. In some instances, the monitoring and validation of data may lead to a determination or further analysis of any data updates, for example, generation of value indicators, and so forth.

Further details relating to the automated device and corresponding methods, data flows, and the like, are provided below.

Example System for Obtaining Electronic Data from a Server

FIG. 1A depicts an example of an architecture 100 of hardware and components in which aspects described herein are implemented, according to aspects of the present disclosure.

In the depicted example, the architecture 100 includes one or more servers 102, which store and provide data to clients or other entities. The architecture 100 also includes client devices 110, which individual clients may use to access the server 102 and obtain information therefrom, and a service provider system 106, which may operate to access the server 102 on behalf of one or more of the clients. These components of the architecture 100 are linked by a network 105 via which these components can communicate. The server 102 and the service provider system 106 may be locally coupled to a database 103 and a database 108, respectively. In some embodiments, though not shown in FIG. 1A, one or both of the database 103 and the database 108 may be coupled directly to the network 105, or through a gateway, an application programming interface (API), or the like.

The server 102 may comprise one or more dedicated servers, or may instead comprise cloud instances, which utilize shared resources of one or more servers. These servers or cloud instances may be collocated and/or geographically distributed. The server 102 may be owned or operated by the company or on behalf of the company and provide client access to data and/or interfaces. The server 102 may also comprise or be communicatively connected to an application or user interface (not shown in FIG. 1A). The server 102 may also be communicatively connected to one or more external systems (for example, the Internet, various websites, a public switched telephone network (PSTN), Internet Protocol (IP) telephony systems, a cellular network, apps, other servers, and so forth) via the network 105. The server 102 may be implemented as or by one or more computing devices, for example a computing device 200 illustrated in FIG. 2 discussed below.

The server 102 may comprise user interface and/or application servers that host one or more user interfaces, telephony applications, web-based applications, and the like. In embodiments in which a website is provided, the website may comprise one or more user interfaces, including, for example, webpages generated in HyperText Markup Language (HTML) or other language. In such instances, the server 102 transmits or serves these user interfaces in response to requests from client devices 110 or the service provider system 106. In some embodiments, these user interfaces may be served in the form of a wizard, in which case two or more user interfaces or screens may be served in a sequential manner, and one or more of the sequential user interfaces may depend on an interaction of the client device 110 and/or the service provider system 106 with one or more preceding user interfaces. Such user interfaces may comprise a combination of content and elements, such as text, images, videos, animations, references (for example, hyperlinks), frames, inputs (for example, text boxes, text areas, checkboxes, radio buttons, drop-down menus, buttons, forms, and the like), scripts (for example, JavaScript), and the like, including elements comprising or derived from data stored in one or more databases (for example, the database 103) that are locally and/or remotely accessible to the server 102.

In embodiments in which the server 102 provides telephony applications, the telephony applications may include a voice menu system (for example, an interactive voice response (IVR) system), and the server 102 may comprise an interface with the PSTN, cellular networks, or an IP telephony system that enables access to the server 102 and data stored in the database 103 via voice calls or corresponding messages. The interface of the server 102 may be configured to provide messages, for example, to the voice menu system via telecommunications signaling, such as dual-tone multi-frequency (DTMF) signaling, audio, or similar responses. In such instances, the server 102 enables the clients to call one or more phone numbers and access the voice menu system via one of the client devices 110. The clients can access and navigate a phone menu provided by the voice menu system using one of the client devices 110 (for example, a telephone providing selection and data entry capabilities via button presses) and respond to prompts and messages as necessary to gain access to the client's data at the server 102. The phone menu may provide prompts and options in response the client devices 110 or the service provider system 106 calling the phone number and navigating the voice menu system. In some embodiments, the voice menu system may request the client or client representative to enter a number or sequence of numbers in response to the prompts. The voice menu systems may expect or receive responses to the prompts via the telecommunications signaling (for example, the DTMF signaling, audio, or similar responses). Such voice menu systems may only provide audio and/or text message content, including content comprising or derived from data stored in the database 103.

The server 102 may use the database 103 to store data (for example, client identifying data, data associated with the client, and the like). The server 102 may provide access to the data stored in the database 103 to clients or client representatives that are authorized to receive such information. The database 103 may comprise any suitable database, including without limitation MYSQL®, ORACLE®, IBM®, SQL SERVER®, SYBASE®, MICROSOFT ACCESS®, and the like, including cloud-based database instances and proprietary databases. The data stored in the database 103 may be stored in a standardized manner (for example, with particular fields and information) such that automated user interfaces are able to access data in the database 103. Access to the data in the database 103 may be handled, for example, by server-side web and/or telephony technology, such as a servlet or other software module or telephony application or voice menu system executed by the server 102.

The company may use the server 102 to store data associated with the clients for internal use and/or access by the clients or representatives of the clients. In the VA example introduced above, the company may be the VA and the VA may operate or utilize the server 102 to store benefits data regarding Vet clients. Thus, the database 103 may include files of records and other information for the Vet clients. The server 102 may also provide access to those records and other information via user interfaces to the Vet clients or the Vet benefits service providers. For example, the Vets or the Vets benefits service providers can access the Vets' client data at the server 102 using a web-based form or web-browsing (for example, navigating options on a website and entering responses and/or identifying information). Alternatively, or additionally, the server 102 may provide access to all or part of the records in the database 103 via voice or message based telephone connections. For example, the Vets or the Vet benefits service providers can use a telephone and navigate a phone menu provided by the voice menu system, entering responses and/or identifying information to gain access to the client's data at the server 102 based on prompts.

As introduced above, the communications between the client devices 110, the service provider system 106, the database 108, and/or the server 102 are completed via the network 105. The network 105 may include the Internet, and the server 102 may communicate with the client devices 110 through the Internet using standard transmission protocols, such as HyperText Transfer Protocol (HTTP), Secure HTTP (HTTPS), and the like. While the server 102 is illustrated as connected to various systems through a single set of network(s) 105, it should be understood that the server 102 may be connected to the various systems via different sets of one or more networks (not shown). For example, the server 102 may be connected to a telephone system enabling telephone calls with the server 102. Additionally, or alternatively, the server 102 may be connected to the client devices 110 and/or the service provider system 106 via the Internet, an intranet, an ad hoc network, and the like. The network 105 may also include any wired or wireless network, for example, a cellular network (for example, 3G, 4G LTE, 5G, and so forth), local area network (LAN), wide area network (WAN), and the like. Furthermore, while only a few client devices 110, service provider systems 106, and the database 108 are illustrated, it should be understood that the architecture 100 may comprise any number of client devices 110, servers 102, databases 108, and service provider systems 106.

The client devices 110 may comprise any type of computing devices capable of wired and/or wireless communication, including, without limitation, desktop computers, laptop computers, tablet computers, smart phones or other mobile phones or devices, land-line telephones, wearable mobile devices, servers, and the like. The client devices 110 may be one or more computing devices such as for example the computing device 200 illustrated in FIG. 2, discussed below.

The service provider system 106 may comprise a computing device configured to access the server 102 on behalf of one or more clients. In some embodiments, the service provider system 106 may include a user interface enabling operators of the service provider system 106 to interact with various aspects of information obtained, processed, and/or utilized by the service provider system 106. For example, the service provider system 106 may obtain information from the one or more clients and use that information to access the server 102 (for example, via a telephone call, a website, or the like). The service provider system 106 may utilize an automated system that dials a call to the server 102, navigates a phone menu provided by the voice menu system of the server 102, provides a client identifier or reference number for the client to the server 102 via the phone menu, and obtains the requested client data from the server 102. The service provider system 106 may repeat this process for any and all clients for whom the service provider system 106 has agreed to provide such a service and for whom the service provider system 106 has the necessary client identifiers or reference numbers to provide to the server 102 when requesting the server's client data. In some instances, when the service provider system 106 obtains data for multiple clients, the service provider system 106 may make multiple calls (one for each client) and complete the steps above. Alternatively, the service provider system 106 may make a single call and complete the steps above for each client before disconnecting the single call. In some instances, the service provider system 106 may make multiple calls and process client records for multiple clients in parallel.

Figure 1B:
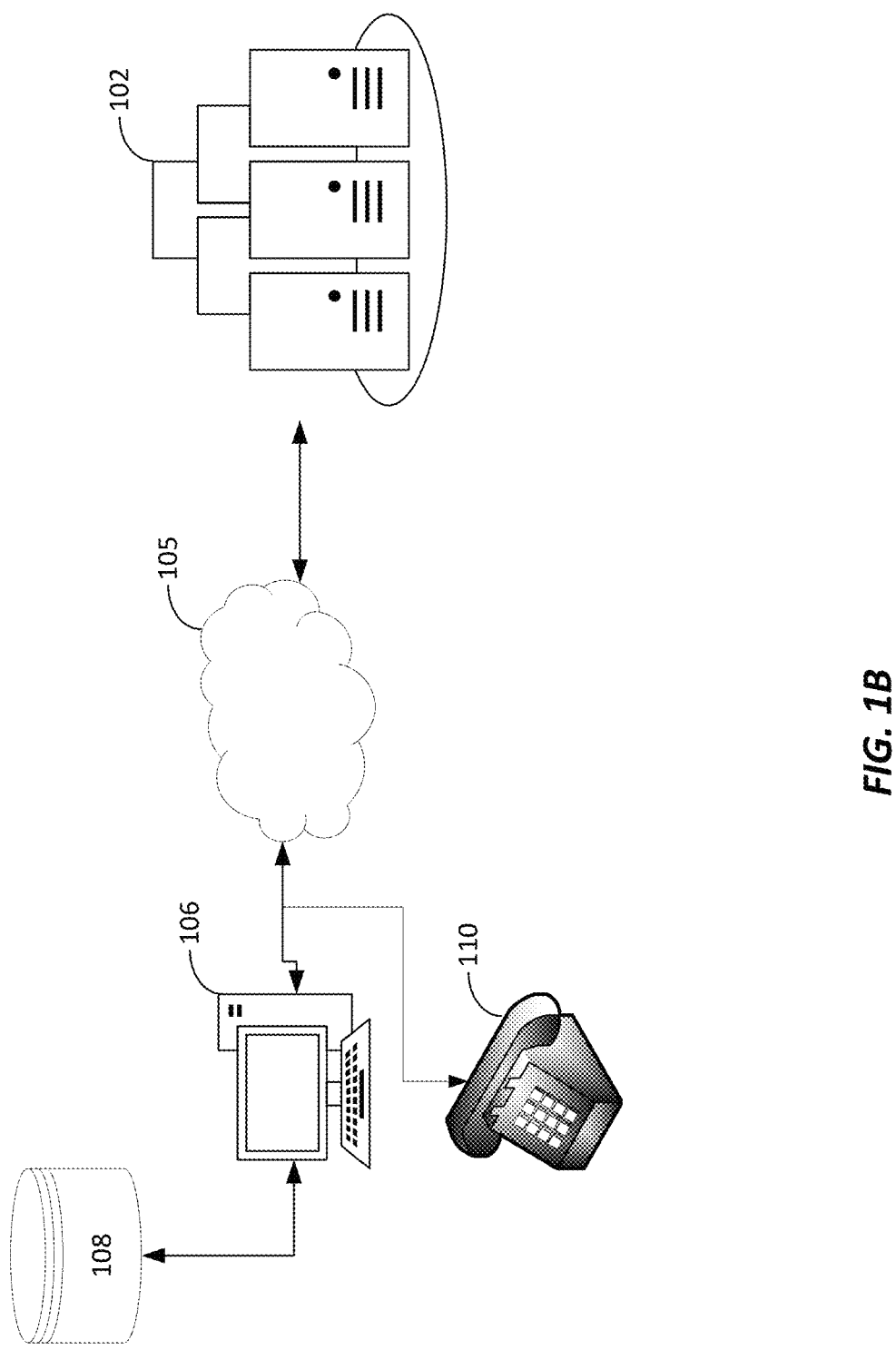
FIG. 1B depicts an example data flow between components of the architecture of FIG. 1A involved in the systems and methods described herein.

FIG. 1B depicts example data flows between components of the architecture 100 of FIG. 1A, according to aspects of the present disclosure. For example, a client may use the client device 110 (for example, a telephone) to call a phone number associated with the company to gain access to the server 102. The call between the client device 110 and the server 102 may occur via the PSTN, cellular networks, or IP telephony system enabled by the network 105. The communications between the client device 110 and the network 105 and, similarly, the network 105 and the server 102 are bidirectional where the client provides identification information and menu selections using the client device 110, for example, a telephone, to navigate the phone menu of the server's voice menu system to the server 102 and receives data from the server 102 in response to the identification information and menu selections.

Similarly, the service provider system 106 may obtain client information, for example the client's identifier or reference number, and phone menu instructions from the database 108 and use this information to access the server 102 and access the data regarding the client. The service provider system 106 may be configured to use the phone menu instructions (for example, stored in a configuration file) to identify delays and options to select when navigating the phone menu of the server's voice menu system. The phone menu instructions may identify what sequence of "buttons to press" (i.e., what selections to enter via the phone menu) to navigate the phone menu options appropriately to access the client's data at the server 102. Upon navigating the menu appropriately and entering the client's identification information, the service provider system 106 may receive the client's data from the server 102 via the phone connection (for example, as an audio message) and store the received data in the database 108, associated with the respective client. Further details of how the service provider system 106 accesses and loads client information, accesses the server 102 via a voice menu system, and obtains and processes the server's client data are provided below.

Figure 2:
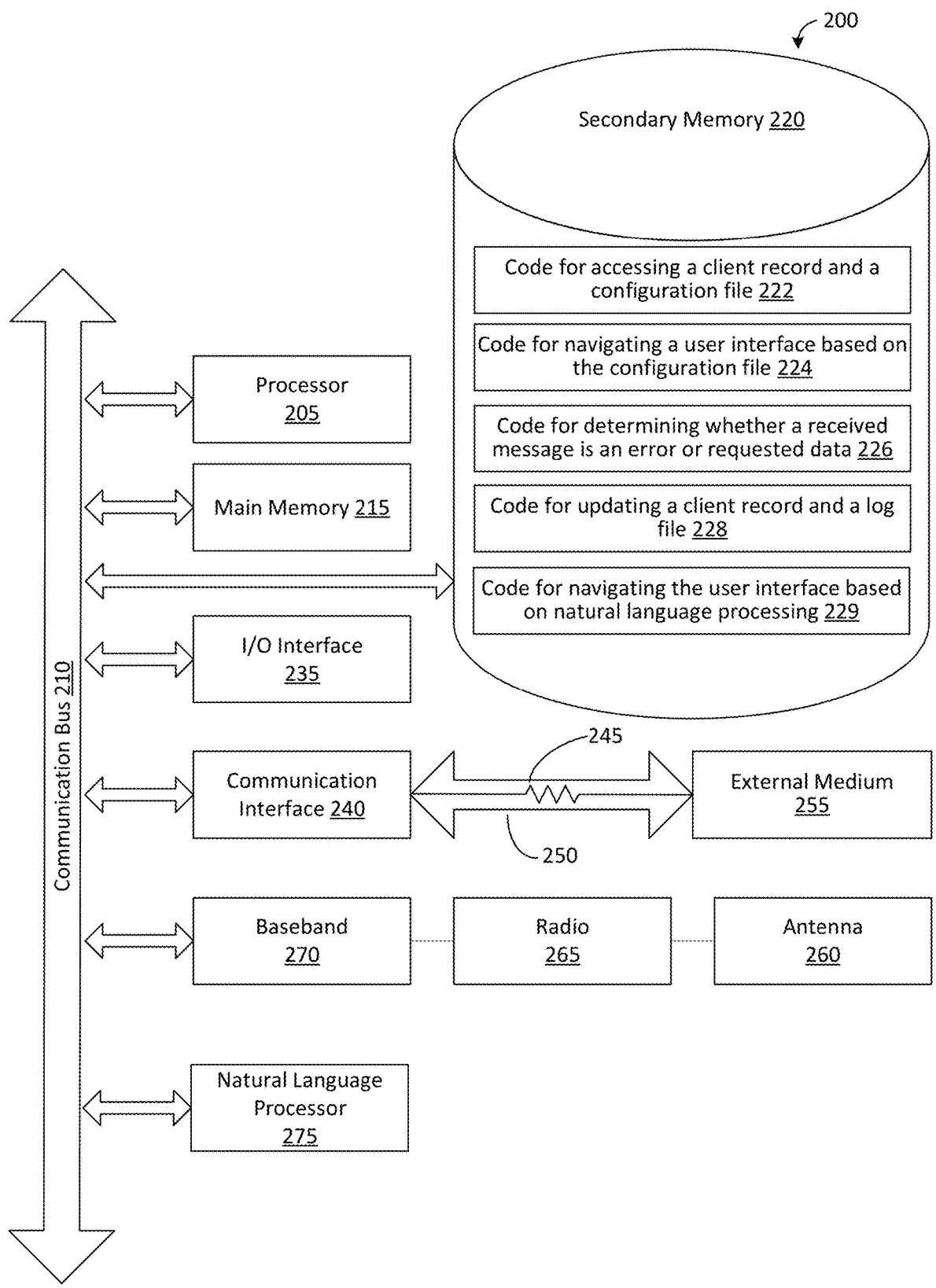
FIG. 2 depicts an example processing system that may be a device in the architecture of FIGS. 1A and 1B and configured to perform the methods described herein.

FIG. 2 illustrates an example wired and/or wireless computing device 200 suitable for use in the systems and methods described herein. With reference to the architecture 100 in FIGS. 1A and 1B, the device 200 may implement one or more of the server 102, the service provider system 106, and one or more of the client devices 110. In some instances, the device 200 may be programmed with software and/or comprise firmware comprising instructions that, when executed by at least one processor, cause the device 200 to perform various functions, processes, and/or methods described herein, for example, as described in connection FIGS. 1A, 1B and 3-10.

The device 200 preferably includes one or more processors, such as processor 205. Additional processors may be provided, such as an auxiliary processor to manage input/output, an auxiliary processor to perform floating point mathematical operations, a special purpose microprocessor having an architecture suitable for fast execution of signal processing algorithms (for example, a digital signal processor), a slave processor subordinate to the main processing system (for example, a back-end processor), an additional microprocessor or controller for dual or multiple processor systems, or a coprocessor. Such auxiliary processors may be discrete processors or may be integrated with the processor 205.

The processor 205 may be connected to a communication bus 210, which may include various channel for facilitating information transfer between components of the device 200. The communication bus 210 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The device 200 may include a main memory 215 and may also include a secondary memory 220. The main memory 215 may provide storage of instructions and data for programs executing on the processor 205. For example, the main memory 215 may provide storage and/or software for the voice menu system and/or application operated by the server 102, corresponding software on the service provider system 106 that enables the service provider system 106 to dial a phone number, navigate the phone menu associated with the dialed phone number, and obtain client data from the phone menu system, among other features described herein. The main memory 215 may store software modules that, when executed by the processor 205, perform the functions described with reference to one or more of FIGS. 1A, 1B and 3-10. The main memory 215 may comprise semiconductor-based memory, such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 220 may optionally include a code comprising one or more instructions for causing the processor 205 to perform one or more functions. Specifically, the secondary memory 220 may include code 222 for accessing a client record and a configuration file. Such code may be configured to access the client record from a client list identifying a plurality of records in a data store or database and a configuration file including instructions for accessing and navigating a user interface. The secondary memory 220 may further include code 224 for navigating a user interface based on the configuration file. This code may instruct the processor 205 to follow the instructions in the configuration file and use these instructions to know how, when, and what to enter data into the user interface to navigate the user interface. Furthermore, the secondary memory 220 may include code 226 for determining whether a received message is in error or requested data. These instructions may enable the processor 205 to convert an audio message to text for further processing and parsing by the processor 205. Based on the parsing, the code 226 instructs the processor 205 to determine whether the converted text includes expected data or text in an expected format or not. The code 226 may tell the processor 205 that when the text is not in the expected format, the text represents an error and when the text is in the expected format, to further process the text. In some instances, the secondary memory 220 includes code 228 for updating a client record and a log file. Such instructions may cause the processor 205 to update the client record and the log file when the text includes the expected format of data or cause the processor 205 to update the log file when the text included an error. In some instances, the secondary memory 220 includes code 229 that instructs the processor 205 to navigate the user interface using natural language processing. Such instructions may cause the processor 205 to utilize a NLP module (for example, a software or hardware module) to translate the phone menu such that the processor 205 (and the device 200) can interact with the phone menu in real-time without utilizing the configuration file or in conjunction with the configuration file. In some instances, the secondary memory 220 may include more or less code than as shown and described.

In some embodiments, the secondary memory 220 may store code in an internal memory and/or a removable storage medium, for example a floppy disk drive, a magnetic tape drive, a compact disc ("CD") drive, a digital versatile disc ("DVD") drive, and so forth.

In some instances, the secondary memory 220 may comprise a non-transitory computer readable medium having stored thereon computer executable code (i.e., software) and/or data, for example the code 222, 224, 226, and/or 228 introduced above. The computer software or data stored on the secondary memory 220 is read into the device 200 for execution by the processor 205. In alternative embodiments, the secondary memory 220 may include other similar means for allowing computer programs or other data or instructions to be loaded into the device 200. Such means may include, for example, an external storage medium 255 and/or a communication interface 240. Examples of external storage medium 255 may include an external hard disk drive or an external optical drive, or and external magneto-optical drive. Other examples of secondary memory 220 may include semiconductor-based memory such as programmable read-only memory ("PROM"), erasable programmable read-only memory ("EPROM"), electrically erasable read-only memory ("EEPROM"), or flash memory (block oriented memory similar to EEPROM). The removable storage medium may allow software and data to be transferred from an external storage medium 255 to the device 200.

The device 200 may also include an input/output ("I/O") interface 235. The I/O interface 235 facilitates input from and output to external devices. For example the I/O interface 235 may receive input from a keyboard, mouse, touch screen, gestures detecting camera, speech command module, etc. and may provide output to a display generated by the graphical user interface. The I/O interface 235 is capable of facilitating input from and output to various alternative types of human interface and machine interface devices alike. As introduced above, the device 200 may also include the communication interface 240. The communication interface 240 allows software and data to be transferred between the device 200 and external devices (for example, printers), networks, or information sources. For example, computer software or executable code may be transferred to the device 200 from a network server via the communication interface 240. Examples of the communication interface 240 include a modem, a network interface card ("NIC"), a wireless data card, a communications port, a PCMCIA slot and card, an infrared interface, and an IEEE 1394 fire-wire, just to name a few. The communication interface 240 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well. In some instances, the communication interface 240 enables communications via a networked connection, the IP telephony system, the cellular networks, or the PSTN.

Software and data transferred via the communication interface 240 are generally in the form of the electrical communication signals 245. The electrical communication signals 245 are preferably provided to the communication interface 240 via a communication channel 250. In one embodiment, the communication channel 250 may be a wired or wireless network, or any variety of other communication links. The communication channel 250 carries the electrical communication signals 245 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs or software), as introduced above, can be stored in the main memory 215 and/or the secondary memory 220. The computer programs can also be received via the communication interface 240 and stored in the main memory 215 and/or the secondary memory 220. Such computer programs, when executed, enable the device 200 to perform the various functions of the present invention as previously described.

In this description, the term "computer-readable medium" is used to refer to any non-transitory computer-readable storage media used to provide computer executable code (for example, software and computer programs) to the device 200. Examples of these media include the main memory 215, the secondary memory 220 (including the internal memory, the removable storage medium, and the external storage medium 255), and any peripheral device communicatively coupled with the communication interface 240 (including a network information server or other network device).

In an embodiment that is implemented using software, the software may be stored on a computer readable medium and loaded into the device 200 by way of the removable storage medium, the I/O interface 235, or the communication interface 240. In such an embodiment, the software can be loaded into the device 200 in the form of electrical communication signals 245. The software, when executed by the processor 205, may cause the processor 205 to perform the inventive features and functions previously described herein.

The device 200 may also include optional wireless communication components that facilitate wireless communication over a voice and over a data network. The wireless communication components comprise an antenna system 260, a radio system 265 and a baseband system 270. In the device 200, radio frequency ("RF") signals are transmitted and received over the air by the antenna system 260 under the management of the radio system 265.

The device 200 further comprises a natural language processor 275 configured to enable the device 200 to process content and enable the device to "understand" the processed content. In some instances, the natural language processor 275 comprises software or code that enables the processor 205 to process and understand content and accurately extract information and/or insights from the content and generate responses thereto, as appropriate. In some instances, the natural language processor 275 is a separate processor from the processor 205 that performs natural language processing on demand as needed by the device 200.

Example Data Flow for Accessing and Obtaining Electronic Data from a Server

Figure 3:
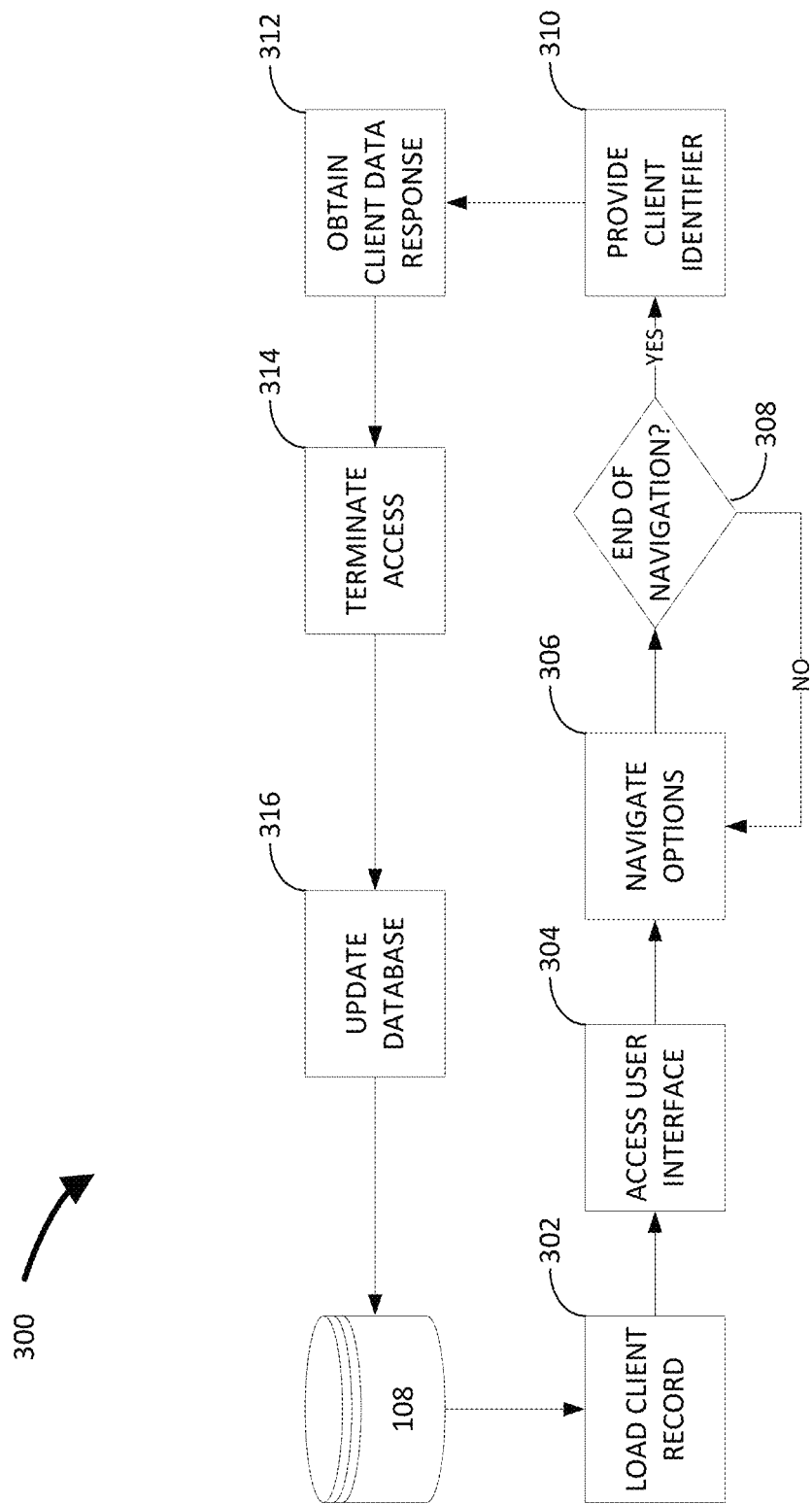
FIG. 3 depicts an example of a high-level data flow of communications for confirming data corresponding to individuals between components in the architecture of FIGS. 1A and 1B.

FIG. 3 depicts an example of a high-level data flow 300 of communications for confirming data corresponding to clients between components in the architecture 100 of FIGS. 1A and 1B.

The data flow 300 shown in FIG. 3 represents how the service provider system 106, operating on behalf of one or more clients, may obtain a client record, access the server 102 via a user interface of or hosted by the server 102, and obtain client data. The data flow 300 represents high-level operations of an automated user interface navigation system or application. Specifically, the data flow 300 may provide high-level steps of an automated method for accessing a user interface using the service provider system 106 integrated with client data and a configuration file or navigation processing to navigate the user interface to retrieve specific client data. This client data may be converted to text and/or numbers for comparison against the integrated client data to determine if there is a difference between the data, which may indicate a change in the data. Though not shown in the data flow 300, the data flow 300 may involve creating and/or maintaining a log of all transactions and corresponding results as well as a file with details of the data comparison performed. In some instances, one or more aspects of the data flow 300 is performed with an application programming interface (API).

The data flow 300 starts at block 302, where the service provider system 106 may receive a client record from the database 108 and load the client record for further actions. In some instances, as introduced above, the service provider system 106 may comprise the device 200 of FIG. 2. Thus, the processor 205 may load the client record into the main memory 215 or secondary memory 220 after receiving the client record from the database 108, for example, via the communication interface 240.

In some instances, each and/or individual clients have corresponding client records in the database 108. The client records may include various information for the respective client, for example, personally identifiable information ("PII"), confirmation or transaction reference numbers, account information, and the like. In the instance of insurance and/or benefits tracking records, the client records may also include a current level of benefits for the client, previous insurance claims and/or benefits adjustment requests, and corresponding reference numbers for previous and/or pending claims or benefits adjustment requests.

At block 304, the service provider system 106 may access the user interface of by the server 102, for example, based on commands from the processor 205 and via the communication interface 240. In some instances, the user interface is web-based and accessed via the Internet or another networked connection. Similarly, the user interface can be the phone menu provided by the voice menu system of the server 102 and accessed via the IP telephony system, the cellular networks, and/or the PSTN. Alternatively, or additionally, the service provider system 106 may utilize any other type of user interface by which the server 102 may make client data available to clients.

Once the service provider system 106 accesses the server 102 via a user interface at block 304, the service provider system 106 automatically navigates options provided by the user interface at blocks 306 and 308. When the user interface is a graphical user interface (GUI), the service provider system 106 may navigate the options by making appropriate selections and/or providing appropriate information to progress through different screens and/or prompts to arrive at a prompt or input for a client identifier from the loaded client record, at block 310. Similarly, when the user interface is the phone menu (for example, voice-based system), the service provider system 106 may navigate the phone menu through different prompts and/or recordings by making appropriate selections and entries (for example, by creating audio tones associated with numbered and other telephone keys) to arrive at the prompt or input for the client identifier from the loaded client record.

At block 310, the service provider system 106 may provide the client identifier for the client record loaded at block 302 to the user interface.

The service provider system 106 may then obtain the client data from the server 102 at block 312. The server 102 may provide or present the client data visually (for example, as text or as part of a visual presentation) when the user interface is web-based or graphical or may present the client data as audio (for example, when the user interface is the phone menu).

At block 314, the service provider system 106 may terminate the connection or access to the server 102 and the update the client record in the database 108 at block 316 based on the obtained client data from block 312. Further details regarding the navigation of the user interface and processing of obtained client data are provided below with respect to FIGS. 4-6, 8, and 9.

Integrating the VA and Vet example above, at block 302, the Vet benefits service provider (for example, utilizing or embodied by the service provider system 106) may load a client record for a Vet client from a database (for example, the database 108) of Vet client records corresponding to Vets that the Vet benefits service provider serves. At block 304, the Vet benefits service provider accesses the VA phone number (to access the VA server 102) and corresponding phone menu. The Vet benefit service provider can navigate the VA phone menu at blocks 306 and 308 based on a configuration file with instructions for navigating the phone menu or using NLP of the phone menu. At block 310, the Vet benefits service provider provides the client identifier or reference number for the loaded client record from block 302 before receiving the response from the VA at block 312. The Vet benefits service provider then terminates access to the VA phone number at block 314 and then updates the client record and corresponding database based on the data received from the VA.

Figure 4:
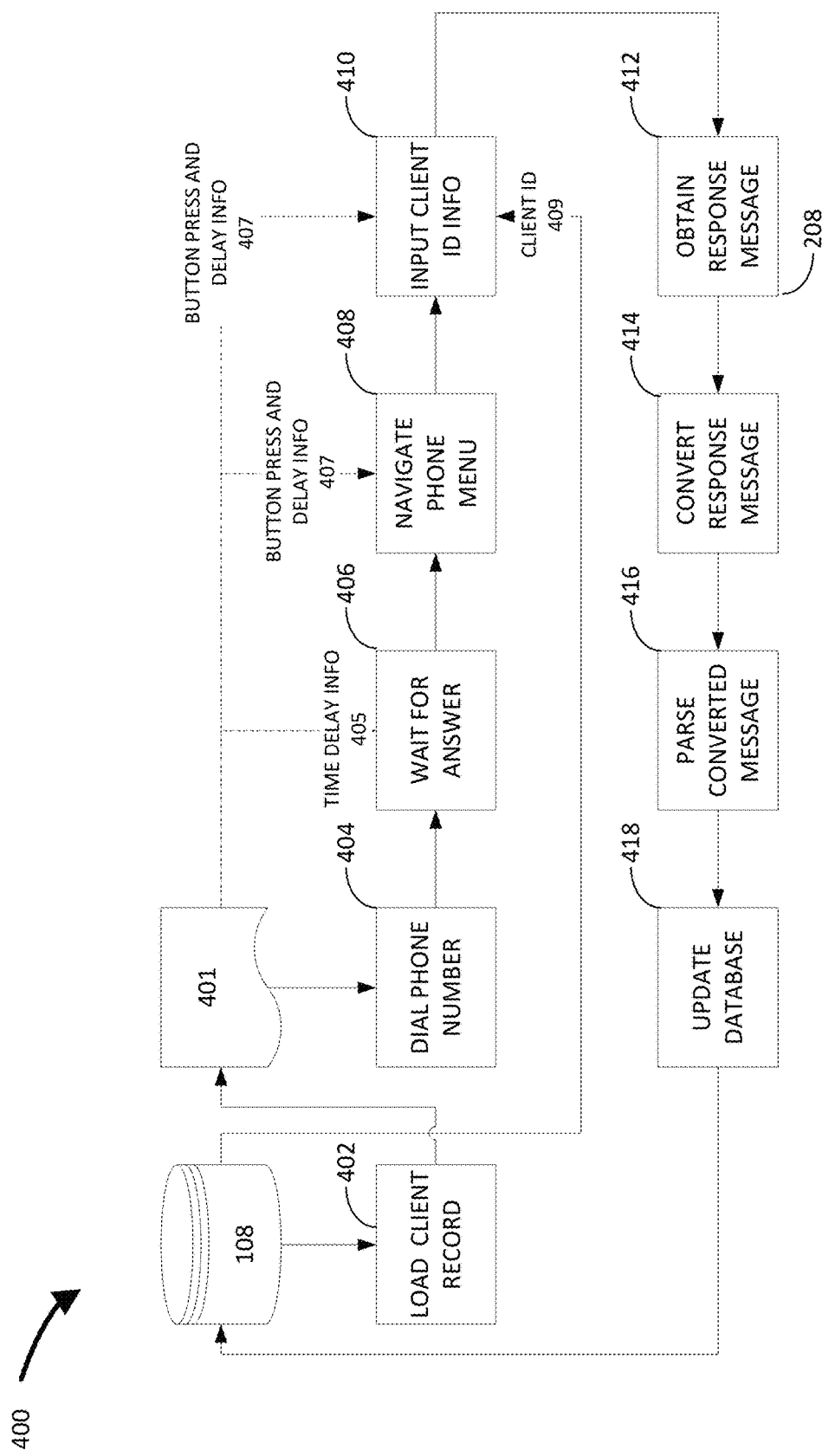
FIG. 4 depicts an example of a data flow of a method for accessing and navigating an automated user interface to access the data corresponding to the individuals according to the data flow of FIG. 3.

Example Data Flow for Accessing and Obtaining Electronic Data from a Server Using a Configuration File FIG. 4 depicts an example of a data flow 400 of an algorithm for accessing and navigating an automated user interface provided by the server 102 to access the data corresponding to the clients according to the data flow 300 of FIG. 3. The data flow 400 provides additional details for some embodiments of obtaining the client data from the server 102 by the service provider system 106, specifically via the phone menu provided by the voice menu system of the server 102.

At block 402, the service provider system 106 may receive a client file from the database 108 and load a client record from the client file. The client file may comprise client records for clients for which the service provider system 106 is going to access the server 102 for confirmation or updating of client data. The client records associated with the client file may include client identifying PII, an identification, confirmation, reference, or transaction identifier, and/or client data to be validated or updated via communications with the server 102. When the client file includes more than one client record, then aspects of the data flow 400 may be performed iteratively for individual client records. For example, when the client file includes two client records that each include the identifier and the client data to be validated or updated, aspects of the data flow 400 (for example, blocks 404-418) may be repeated twice, once for each client record.

Once the client record is loaded (for example, into the main memory 215 or secondary memory 220), the service provider system 106 may access a configuration file 401. The configuration file 401 may include instructions for communicating with the server 102 via the user interface. For example, when the user interface is the voice menu system, the configuration file may instruct the service provider system 106 how to navigate the voice menu system when communicating with the server 102.

In various embodiments, the configuration file may include details regarding accessing the user interface of the server 102 (for example, the phone number to dial to access the voice menu system), delays (for example, how long to wait while the phone menu provides a recorded message), what value to enter into the phone menu (for example, values to progress through option trees or to enter the client identifier or reference number), when to record a message (for example, to obtain corresponding client data from the server 102) and so forth. In some embodiments, the configuration file 401 further includes the phone number(s) to call to contact the server 102, a source of the client identifier or reference number to enter, where to save a response received from the server, and where to save log and/or transaction information, a threshold for determining a change in data, and other potential configuration items. In some embodiments, the configuration file 401 may identify how to encrypt and/or decrypt data from the client records (for example, how to decrypt the client identifier to provide to the server 102, if necessary). In some embodiments, the configuration file 401 may comprise a structured data file, for example an XML, file, a JSON file, and/or the like.

At block 404, the service provider system 106 dials a phone number (for example, as provided by the configuration file 401) for the server 102. At block 406, the service provider system 106 waits for an answer to the call and initiation of the information exchange with the server 102. In some instances, the configuration file 401 includes data regarding how long to wait for the answer, for example, provided to the service provider system 106 as time delay information 405. At block 408, the service provider system 106 navigates the phone menu based on button press and delay information 407 received from the configuration file 401. At block 410, the service provider system 106 may enter or input the client identifier or reference number, based on the button press and delay information 407 from the configuration file 401. In response to inputting the client identification information at block 410, the service provider system 106 may obtain a response message from the phone menu and the server 102, for example in the form of an audio message. The service provider system 106 may convert the audio message into a text message at block 414 and then parse the converted text message at block 416. In some instances, parsing the converted text message comprises identifying when the text message includes the corresponding client data or other information, such as an error message. For example, in some instances, a poor connection between the service provider system 106 and the server 102 may result in loss of information when the service provider system 106 is entering the client identification information at block 410, or changes in the phone menu can cause the instructions in the configuration file 401 to be incorrect. Thus, the converted message can include either the corresponding client data or error information. At block 418, the service provider system 106 updates the client data in the client record with the corresponding client data from the parsed message. This update can be stored in the database 108 to ensure that the database 108 includes the updated information from the server 102. The data flow 400 can be repeated for subsequent client records in the client file until the client data for corresponding client records in the client file have been confirmed or updated with the corresponding client data from the server 102.

For example, assume that the phone menu for the server 102 access via the data flow 400 includes the following components:

Greeting of duration 5 seconds
1$^{st}$ option tree with recitation duration of 7 seconds
2$^{nd}$ option tree with recitation duration of 4 seconds
Prompt for client identifier or reference number with duration of 5 seconds
Delay after entering client identifier or reference number with duration of 5 seconds
Navigation from the 1$^{st}$ option tree to the second option tree requires entry of "8"
Navigation from the 2$^{nd}$ option tree to the prompt for the client identifier or reference number requires entry of "3"
Entry of client identifier or reference number requires 8 digit entry followed by "#"

Thus, the instructions in the configuration file 401, as written in a sentence structure, may instruct the service provider system 106 to dial the phone number for the server 102 and:

Wait 12 seconds (5 seconds for greeting and 7 seconds for 1$^{st}$ option tree recitation)
Enter value "8" (to progress through the 1$^{st}$ option tree to the 2$^{nd}$ option tree)
Wait 4 seconds (recitation for 2$^{nd}$ option tree)
Enter value "3" (to progress through the 2$^{nd}$ option tree and to the prompt for the client identifier or reference number)
Wait 5 seconds (recitation of prompt for the client identifier or reference number)
Enter 8 digit client identifier or reference number followed by the "#"
Wait 5 seconds (delay after entering client identifier or reference number)
Begin recording the response from the server 102.

Thus, using the instructions in the configuration file 401, the service provider system 106 need not be capable of interpreting and/or understanding voice prompts and can still automatically navigate the phone menu and obtain the desired corresponding client data. However, the service provider system 106 implementing the data flow 400 may be unable to handle changes to the phone menu of the voice menu system. Instead, the service provider system 106 may utilize natural language processing (NLP) to navigate dynamic phone menus (as discussed below with reference to FIG. 5) with reduced errors and minimal human interaction as compared to the data flow 400. In some instances, the service provider system 106 may update the configuration file 401 based on the NLP in response to changes identified in the phone menu (for example, identification of error in previous navigation of the phone menu, and the like).

Figure 5:
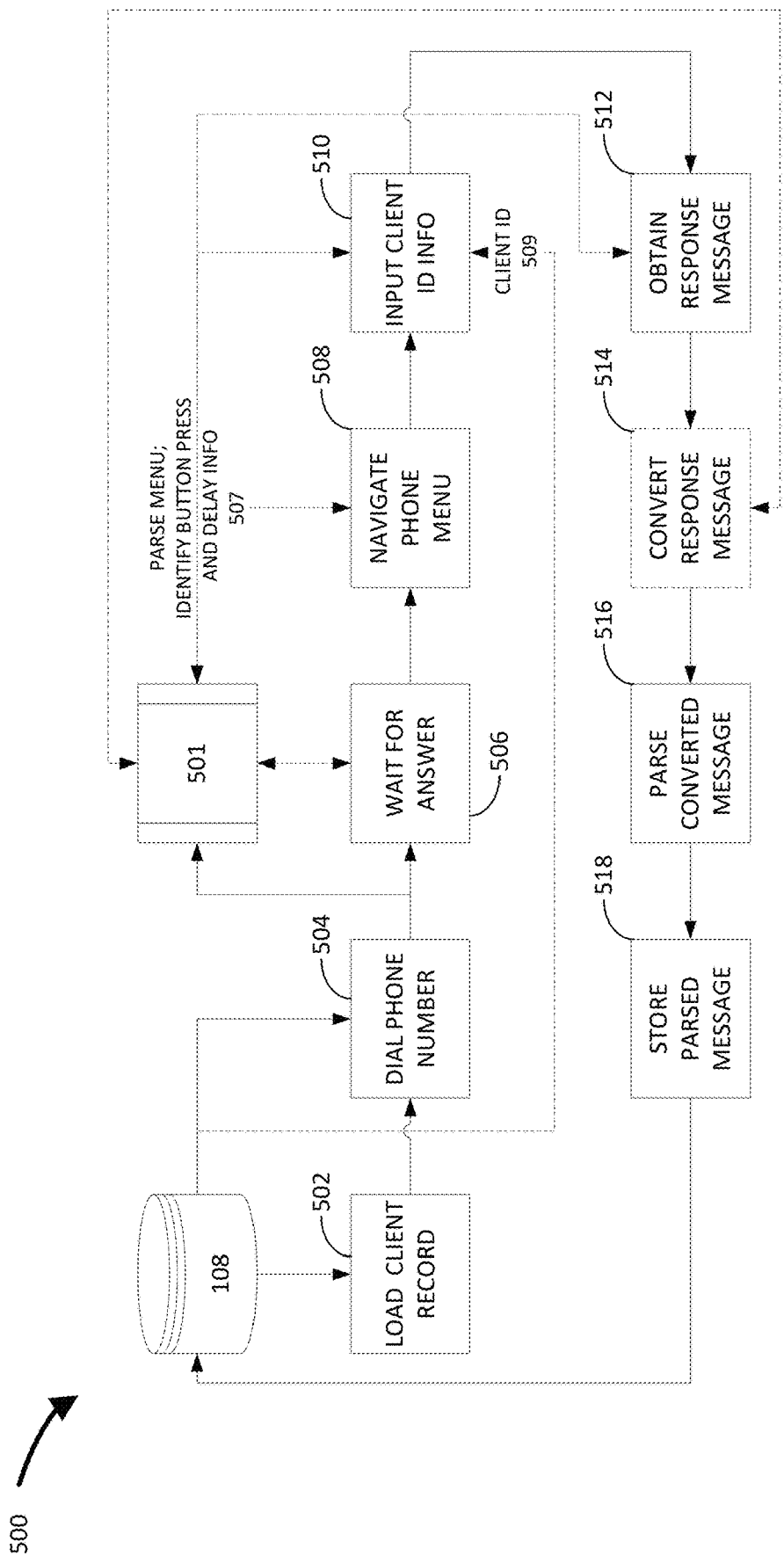
FIG. 5 depicts an example of a data flow of a method for accessing and navigating the automated user interface using natural language processing to access the data corresponding to the individuals according to the data flow of FIG. 3 and to generate instructions for navigating the automated user interface.

Example Data Flow for Accessing and Obtaining Electronic Data from a Server Using Natural Language Processing FIG. 5 depicts an example of a data flow 500 of a method for accessing and navigating the automated user interface of the server 102 using NLP to access the data corresponding to the clients according to the general data flow 300 of FIG. 3.

The data flow 500 provides additional details for some embodiments of obtaining the client data from the server 102 by the service provider system 106, specifically via the user interface provided by the voice menu system of the server 102. Blocks of the data flow 500 may be performed by different components in the architecture 100 of FIG. 1A. For example, block 502 may be performed by one or both of the service provider system 106 and the database 108. The blocks 501-518 may be performed by the service provider system 106, as embodied by the device 200 of FIG. 2. Furthermore, the blocks 501-518 performed by the service provider system 106 may be performed by different components of the service provider system 106, as will be explained further below.

Block 502 may be similar to block 402 of FIG. 4. Specifically, at block 502, the service provider system 106 may receive the client file from the database 108 and load one the client records from the client file, for example, into memory. As described above, the client file may comprise client records for clients for which the service provider system 106 is going to access the server 102 for confirmation or updating of client data. When the client file includes more than one client record, then aspects of the data flow 500 may be performed for individual client records. For example, when the client file includes two client records that each include the identifier and the client data to be confirmed or updated, aspects of the data flow 500 (for example, blocks 504-518) may be repeated, once for each client record. In some aspects, the database 108 may load the client file directly into a main memory 215 or the secondary memory 220 of the service provider system 106. Alternatively, the database 108 and the service provider system 106 may communicate via the communication interface 240 or another interface of the service provider system 106. When the service provider system 106 receives the client file from the database 108 via an interface, the processor 205 of the service provider system 106 can load the client file and respective client records into the memory of the service provider system 106.

Once the client record is loaded into the memory, the service provider system 106 may dial a phone number for the server 102. The phone number for the server 102 may be received from a configuration file (not shown) or received from the database 108.

After dialing the phone number for the server 102 at the block 504, the service provider system 106 may wait for an answer to the call at block 506 and also activate a process 501 that enables the service provider system 106 to perform NLP and dynamically interpret and navigate the phone menu of the server 102 accessed via dialing the phone number. In some instances, the NLP is performed by the natural language processor 275 of the device 200. The NLP enables the service provider system 106 to interpret text and/or audio and understand data presented to the service provider system 106. Thus, for the phone menu provided by the voice menu system of the server 102 that is accessed by dialing the phone number, the service provider system 106 is able to understand the option tree(s) and identify what option(s) to enter and when to enter the client identifier or reference number.

By utilizing the natural language processor, the service provider system 106 may reduce reliance on the configuration file 401 of FIG. 4, or otherwise augment its capability with respect to the configuration file. This would enable the service provider system 106 to navigate the phone menu even if there are any changes to the instructions in the configuration file 301 (for example, due to changes in the phone menu, time delays, and the like).

In some instances, the natural language processor 275 perform the NLP by recording any audio message presented by the phone menu, processing the audio message to recognize the speech in the audio message, and convert the recognized speech to appropriately navigate the phone menu and enter information (for example, responses at the option trees and entering of the client identifier or reference number). This may save memory resources where configuration files are not needed and eliminate time lost to errors navigating the phone menu (for example, when changes are made to the phone menu). Instead, the service provider system 106 may use the natural language processor 275 to identify or detect delays in the phone menu, detect option trees, and identify what value to enter into the phone menu to progress through option trees or to enter the client identifier or reference number, determine when to record a message (for example, to obtain corresponding client data from the server 102), and so forth.

As shown in the data flow 500, the NLP process 501 may provide inputs to other blocks, for example blocks 506, 508, and 510. Specifically, the NLP process 501 may monitor the phone call to determine when the phone menu answers the phone call to help the service provider system 106 wait for the voice menu system to answer the phone call with the server 102. Similarly, at block 508, the NLP process 501 assists the service provider system 106 to navigate the phone menu to get to the point of entering the client identifier or reference number at block 510. At block 510, the service provider system 106 may enter the client identifier (for example, obtained from the database 108 via communication 509 or already in the memory of the service provider system 106 from loading the client record into the memory at block 502).

At block 512, the service provider system 106 may obtain and record the response message from the phone menu and the server 102 that includes the corresponding client data (i.e., the data from the server 102 used to compare or update the client data in the client record). In some instances, the NLP process 501 may assist the service provider system 106 to determine when obtain the response message.

Optionally, at block 514, when the service provider system 106 is converting the response message to text or a recognizable format, the service provider system 106 may implement the NLP process 501 to assist in the conversion of the response message and/or the parsing of the converted message at block 516. In combination, the conversion and parsing of the obtained message from block 512 may result in information that the service provider system 106 is able to process (for example, is in a format that the service provider system 106 can use to update the database 108 at block 518 or utilize as a trigger for different operations (for example, update an error log if the obtained response message indicates an error or successful receipt of data), and so forth). Thus, the converted message can include either the corresponding client data or error information.

At block 518, the service provider system 106 updates the client data in the client record with the corresponding client data from the parsed message. This update can be stored in the database 108 to ensure that the database 108 includes the updated information from the server 102. The data flow 500 can be repeated for subsequent client records in the client file until the client data for corresponding client records in the client file have been confirmed or updated with the corresponding client data from the server 102.

For example, assume that the phone menu for the server 102 is similar to the phone menu discussed with reference to the data flow 400:

Greeting of duration 5 seconds
$1^{st}$ option tree with recitation duration of 7 seconds
$2^{nd}$ option tree with recitation duration of 4 seconds
Prompt for client identifier or reference number with duration of 5 seconds
Delay after entering client identifier or reference number with duration of 5 seconds Instead of reviewing and/or referencing the configuration file 401 continuously throughout the connection with the phone menu, the service provider system 106 operating according to the data flow 500 with the NLP process 501 may instead use the natural language processor 275 to navigate the phone menu. The NLP process 501 may monitor the connection between the service provider system 106 and the phone menu of the server 102 and identify and monitor the greeting and the first option tree. Instead of referencing a record with appropriate delays, the NLP process 501 can identify that the initial message is the greeting and can continue monitoring the messages until identifying that the $1^{st}$ option tree is being presented. The NLP process 501 can monitor the $1^{st}$ option tree and determine that the value of "8" should be entered to progress through the $1^{st}$ option tree. For example, the NLP process 501 may determine that the $1^{st}$ option tree requests the called to identify the reason for calling and that option "8" is the option to choose when the caller wishes to obtain confirmation or update of client data (for example, confirmation or update of client benefit level). The service provider system 106 can then use the NLP process 501 to monitor the $2^{nd}$ option tree and identify to enter the value "3" to progress through the $2^{nd}$ option tree.

For example, the NLP process 501 may determine that the $2^{nd}$ option tree requests that the caller indicate what kind of information the caller will provide to obtain the corresponding client data, with option "3" indicating that the caller will provide the client identifier or reference number.

After entering the value "3", the service provider system 106 may employ the NLP process 501 to monitor for the prompt for the client identifier or reference number, which may indicate a format in which the phone menu expects to receive the client identifier or reference number (for example, a length of 8 digits long followed by the "#" sign). Once the client identifier or reference number is entered, the service provider system 106 may use the NLP process 501 to determine when the service provider system 106 should being recording or monitoring for the response message from the server 102. Thus, the service provider system 106 may obtain the response message from the server at block 512. As introduced above, the service provider system 106 may implement the NLP process 501 to assist with converting and/or parsing the response message at blocks 514 and 516. For example, the NLP process 501 can indicate to the service provider system 106 that the response message does include the corresponding client data and the service provider system 106 can use that indication to store the parsed message at block 518 after converting the response message and parsing it to identify an error or the corresponding client data. Similarly, the NLP process 501 can indicate that the response message includes the error, which the service provider system 106 can use to update an error or log file or otherwise track the error and corresponding information.

Thus, by implementing the NLP process 501, the service provider system 106 can dynamically navigate the phone menu without concern for changes in the phone menu that may otherwise disrupt the configuration file data flow 400 of FIG. 4. Accordingly, the computerized service provider system 106 can be "intelligent" and interpret and/or understand the phone menu and automatically navigate the phone menu to obtain the desired corresponding client data.

Figure 6:
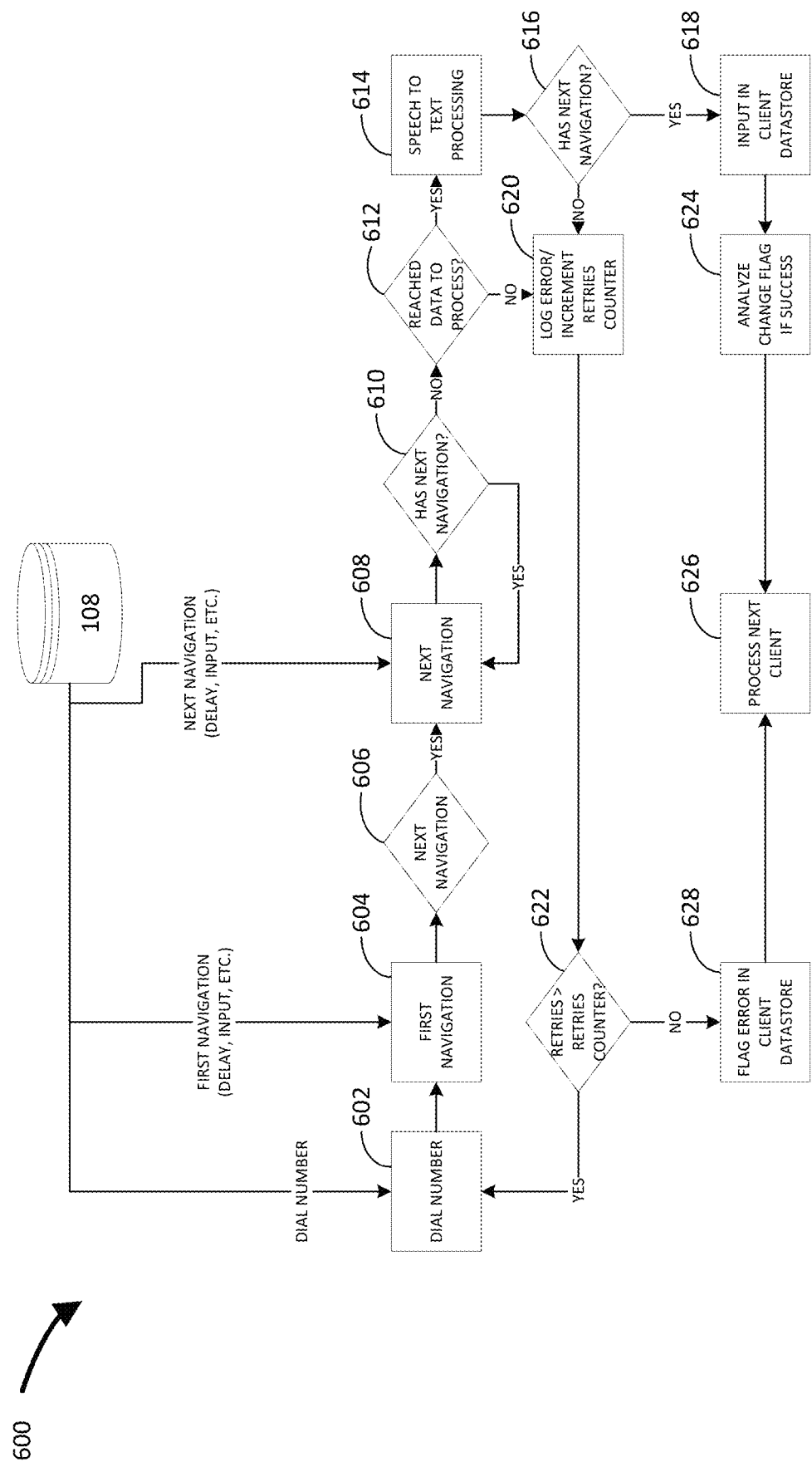
FIG. 6 depicts a detailed data flow of a method for accessing and navigating menus in the automated user interface, including accessing and updating a data store and logging errors.

Example Data Flow for Retrying Navigation of the Phone Menu in Response to Errors FIG. 6 depicts a detailed data flow of a method for accessing and navigating menus in the automated user interface with a loop to retry, including accessing and updating a data store and logging errors and transactions.

Specifically, the data flow 600 provides additional details for some embodiments of logging errors and retrying any failed logic or connection attempts to the server 106. Blocks of the data flow 600 may be performed by the service provider system 106 and/or the database 108 in the architecture 100 of FIG. 1A. For example, the database 108 may provide data for one or more blocks 602, 604, and 608 of the data flow 600, as described in more detail below. The blocks 602-628 may be performed primarily by the service provider system 106, as embodied by the device 200 of FIG. 2.

At block 602, and as introduced above, the service provider system 106 may dial the phone number for the server 102, where the database 108 provides the phone number (for example, as part of the configuration file). The service provider system 106 may then navigate the phone menu for the server 102, for example, based on instructions provided by the database in the configuration file) through blocks 604-610. At one or more of these blocks, the database 108 may provide navigation instructions and/or details, as introduced above.

At block 612, when navigation is completed through blocks 604-610, the service provider system 106 may determine whether the navigation has ended with a response message from the server 102. For example, in some instances where there is an error in navigating the phone menu (for example, the phone menu changed), following the instructions in the configuration file can result in not obtaining a response. For example, the configuration file 401 described above includes instructions to wait 5 seconds after entering the client identifier or reference number before recording the expected response from the server 102. However, if the previous navigation instructions are now incorrect and led to improper navigation of a current phone menu, the voice menu system may disconnect before the 5 second delay is completed, resulting in no data being received from the server 102 for processing.

On the other hand, if the navigation is correct, the service provider system 106 will receive a response to the input of the client identifier or reference number. Thus, a detection of whether the response message was even received can be an initial indicator that an error occurred. Thus, at block 612, if the navigation through the phone menu did not result in data to process (i.e., the response from the server 102), then the service provider system 106 proceeds to block 620 and logs the error. Alternatively, if the navigation through the phone menu did result in data to process at block 612, then the service provider system 106 proceeds to block 614.

At block 614, the service provider system 106 utilizes speech to text processing to convert the received message to text that the service provider system 106 can manipulate.

At block 616, the service provider system 106 may parse the converted message and determine whether the parsed message includes the client data requested from the server 102. If the parsed message does include the client data requested from the server 102, then the service provider system 106 proceeds to block 618.

If the parsed message does not include the client data requested from the server 102, then the service provider system 106 proceeds to block 620. In some instances, the service provider system 106 can determine whether the parsed data includes the requested client data based on examining a size of the message (for example, a length of the message) and/or whether the parsed message includes expected value. For example, the server 102 may present the response to proper navigation and entry of information as a statement similar to "Your benefits level is X". If the service provider system 106 converts and parses the response message and does not identify text corresponding to "Your benefits level is", then the service provider system 106 can identify this response as an error and not including the client data requested.

At block 618, the service provider system 106 may store the response received into a data store (for example, memory or the database 108) and analyze whether there is a change in the client data received from the server 102 as compared to the client data in the corresponding client record at block 624. In some embodiments, the comparison identifies any difference between the client data in the client record and the corresponding client data from the server 102 determine whether the difference exceeds a threshold value. In some embodiments, the threshold value is stored in a file or other data store, for example as part of the configuration file 401 or a separate thresholds file (not shown) that includes acceptable threshold information for changes, and the like. The service provider system 106 may determine a change in a scope of benefits of the client based on the difference exceeding the threshold value. For example, when the difference between the client data in the client record and the corresponding client data exceeds the threshold, the difference in the client data may indicate a change in corresponding benefits, values, and the like, for example an increase or a decrease.

At block 626, the service provider system 106 may progress to a subsequent client record in a client file from the database 108.

When the service provider system 106 determines that the response from the server 102 does not include the expected client data at block 616, the service provider system 106 may log the error at block 620. Logging the error at block 620 may also include the service provider system 106 incrementing a retries counter.

At block 622, the service provider system 106 compares the retries counter with a retries threshold value; if the retries counter value does not exceed the retries threshold value, then the service provider system 106 may retry navigation through the phone menu for the loaded client record using the same navigation information, and so forth. Such a retry may result in successfully obtaining the client data from the server 102 when the navigation errors were caused by a poor connection, technical issues, or other conditions as opposed to changes in the phone menu.

At block 622, when the retries counter value does exceed the retries threshold value, the service provider system 106 may progress to block 628, where the error is logged (for example, in the database 108 in association with the corresponding client record, and so forth). The service provider system 106 the processes the next client record at block 626.

Figure 7:
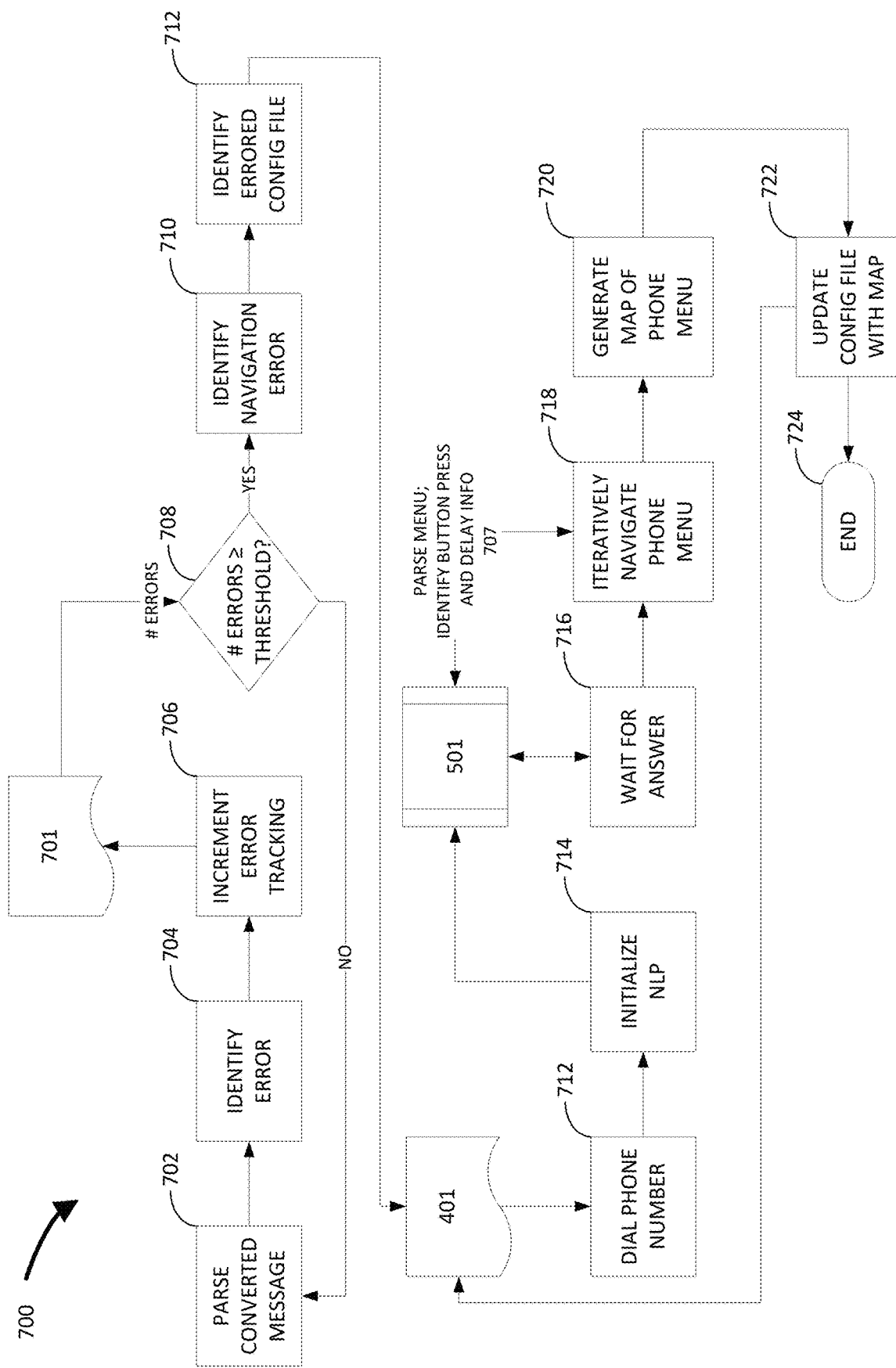
FIG. 7 depicts an example of a flowchart of an algorithm for identifying a need to update and updating instructions for navigating the menus in the automated user interface.

Example Data Flow for Updating a Configuration File Using Natural Language Processing FIG. 7 depicts an example of a flowchart 700 of a method for identifying a need to update and updating instructions for navigating the menus in the automated user interface of the server 102 of FIGS. 1A and 1B. The data flow 700 provides additional details for some embodiments of errors that occur when obtaining the client data from the server 102 by the service provider system 106, specifically via the user interface provided by the voice menu system of the server 102, for example, according to the data flow 400 of FIG. 4.

Blocks of the data flow 700 may be performed one or more components in the architecture 100 of FIG. 1A. In some instances, the service provider system 106 may perform blocks 702-722 of the data flow 700, as implemented by the device 200 of FIG. 2. More specifically, different components of the service provider system 106 may perform the blocks 702-722, as will be explained further below.

At block 702, the service provider system 106 parses the converted message (as obtained from the server 102). Block 702 may correspond to block 416 of the data flow 400 of FIG. 4 or block 516 of the data flow 500 of FIG. 5. As introduced above, parsing the converted message can include the service provider system 106 identifying that the obtained response message includes the corresponding client data to compare with or update the client data in the client record from the database 108 or the error message. The error message can indicate various errors. For example, the error can indicate that the value(s) entered into the phone menu (for example, at the option trees or in response to the prompt) are invalid, suggesting that the phone menu has changed. Thus, the error can indicate an error in navigating the phone menu. Alternatively, or additionally, the error can indicate that the client identifier or reference number entered (for example, as input at block 410) is incorrect (for example, too short, too long, or not recognized as a valid client identifier or reference number. Furthermore, the error can indicate that the client needs to speak with a representative or provide additional information before being given the corresponding client data.

In response to the error, the service provider system 106 may perform various subsequent steps. For example, at block 704, the service provider system 106 may identify that the response message included or indicated the error. In some instances, the service provider system 106 may be unable to identify which error occurred. In some instances, for example, when the natural language processor 275 is available, the service provider system 106 may identify the specific error indicating the response message.

Once the service provider system 106 identifies that the response message indicated the error, the processor 205 may increment an error tracking value in a log or error file 701. In some instances, the log or error file 701 may identify various transaction information. For example, the log or error file 701 may include time and/or data information for each transaction with the server 102. For example, the log or error file 701 may include the data and time that the service provider system 106 contacted the server 102, the time that the contact was terminated, the phone number dialed, the configuration file 401 utilized to navigate the phone menu, and a result (positive or negative) of the transaction (where the transaction is the communication with the server 102 to compare or update the client data in the client record). The log or error file 701 may also include an error counter that tracks a number of error within a time period. For example, the log or error file 701 may be reset periodically (for example, daily, weekly, monthly, and so forth) automatically or manually. In some instances, any error (for example, the error navigating the phone menu, the improper data, and so forth) results in the service provider system 106 incrementing the error counter. In some instances, only errors from navigating the phone menu result in the service provider system 106 incrementing the error counter. In some instances, when the error occurs from navigating the phone menu, the log or error file 701 may utilize different error counters for different configuration files 401 or a particular log or error file 701 may be specific to a particular phone number or phone menu.

Once the service provider system 106 increments the error counter in the log or error file 701, the service provider system 106 may compare the value of the error counter with a threshold value at block 708. In some instances, the service provider system 106 establishes the threshold value or enables an operator of the service provider system 106 to dynamically set the threshold value. If the value of the error counter (i.e., the number or errors) does not exceed the threshold value, then the service provider system 106 may terminate the data flow 700 and/or await the next parsed converted message (for example, for a next client record processed by the service provider system 106). On the other hand, if the service provider system 106 determines that the number or errors indicated by the error counter does exceed the threshold value, then the service provider system 106 identifies the type of error at block 710, specifically that the error is based on the navigation of the phone menu. Furthermore, when the service provider system 106 determines that the error occurred in navigating the phone menu at block 710, then the service provider system 106 identifies which configuration file 401 has caused or resulted in the number of errors that exceed the threshold.

To correct the errors in navigating the phone menu, the service provider system 106 may implement NLP (for example, via the natural language processor 275) to identify a structure of a current phone menu and generate a corresponding map or plan for navigating the current phone menu. As introduced above, the NLP may enable the service provider system 106 to understand what options are available at each option tree, what responses to provide to appropriately navigate through the option trees and the phone menu to provide the client identifier and obtain the corresponding client data. For example, different from the processing of the service provider system 106 with the NLP process 501 in the data flow 500, in the data flow 700, the service provider system 106 may use the NLP process 501 to navigate various options of the options trees in the phone menu. This may involve creating the map or plan that identifies options selections at each options tree that lead to future prompts. For example, when iteratively navigating the phone menu at block 718, the NLP process 501 may navigate each option at each option tree and identify what prompt follows each option selection. The full map generated by the NLP process 501, thus, may include more information than is necessary to navigate the phone menu to obtain the corresponding client data from the server 102.

To implement the NLP and correct a configuration file 401 based on too many errors occurring, the service provider system 106 may identify the appropriate configuration file 401 at block 712 and access the identified configuration file 401. Based on the information in the identified configuration file 401, the service provider system 106 may dial the corresponding phone number for the server 102, which may be identified in the configuration file itself. The service provider system 106 may then initialize the NLP at block 714 and utilize the NLP process 501 of FIG. 5 to navigate the phone menu for the server 102. The service provider system 106 may utilize the NLP process 501 to wait for an answer to the call at block 718 and then iteratively navigate the phone menu at block 718. Iteratively navigating the phone menu may comprise navigating each option of each option tree in the phone menu, as discussed above. Based on such iterative navigating of the phone menu, the service provider system 106 may use the NLP process 501 to generate the map of the phone menu, for example, at block 720. In some instances, generating the map may include identifying which options to select to arrive at the prompt for the client identifier or reference number before obtaining the response message including the corresponding client data. In some instances, generating the map further includes identifying how long to delay entering data into the phone menu to allow recitation of prompts and/or phone menu option trees to be fully recited (if needed by the phone menu). In some instances, where the phone menu is able to accept, recognize, and process inputs entered during recitation of a prompt or options tree, the map may be updated to reduce delays between entering option selections and/or entering of the client identifier or reference number. The identification of the appropriate options to select to arrive at the prompt for the client identifier or reference number before obtaining the response message may identify the route to be introduced into the instructions for navigating the phone menu for the configuration file 401. Thus, at block 722, the service provider system 106 may update the configuration file 401 with the updated map and/or instructions to appropriately navigate the phone menu to obtain the corresponding client data. The data flow 700 can be repeated based on the error counts exceeding the threshold or based on any other indicator that the phone menu changed.

Figure 8:
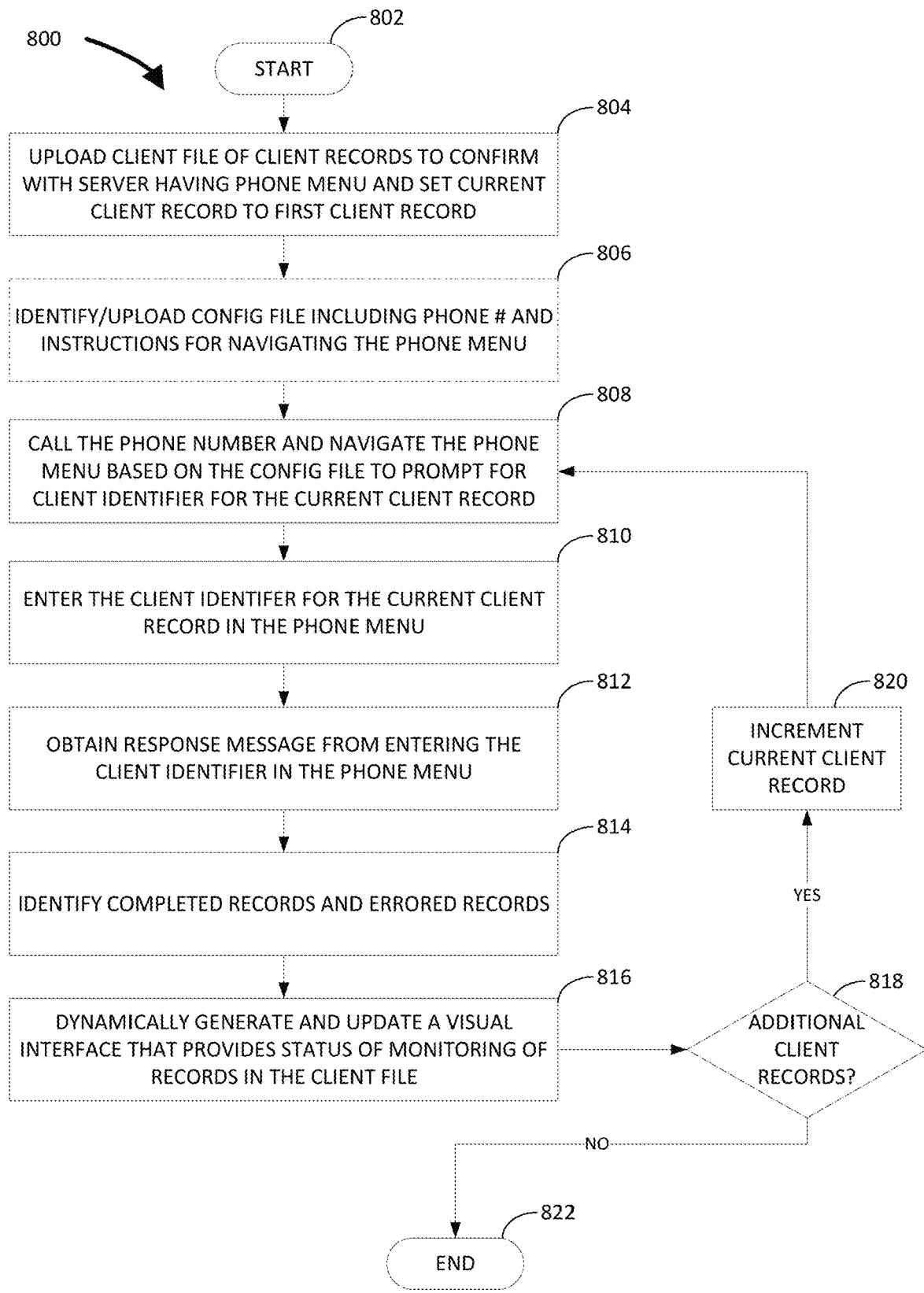
FIG. 8 depicts a flowchart for a method of using a system described herein to update information in a client file using a configuration file, according to the data flow of one or more of FIGS. 2, 3, and 5 and dynamically updating a managing interface.

Example Flowchart for Updating Files and Generating a User Interface Based on Data Obtained from the Phone Menu for a Server FIG. 8 depicts a flowchart for a method 800 of using a system described herein to update information in a client file using the configuration file 401 or NLP process 501, according to the data flow of one or more of FIGS. 3, 4, and 5 and dynamically updating a managing interface as shown in FIGS. 9A-9D. The system that performs the method 800 may be implemented, at least in part, by the service provider system 106 of FIGS. 1A and 1B.

In some aspects, the service provider system 106 provides a user interface (for example, via the I/O interface 235) through which an operator of the service provider system 106 can provide information and/or inputs to the service provider system 106 and view and/or interact with data presented by the service provider system 106. Examples of screenshots of the user interface are described in more detail below with reference to and shown in FIGS. 9A-9D.

The flowchart starts at block 802. At block 804, the service provider system 106 may upload the client file including a plurality of client records that include client data to confirm or update with corresponding client data from the server 102. In some instances, uploading the client file may include introducing the client file to the device 200 from an external medium 255 or storage or loading the client file into the main memory 215 or secondary memory 220 from any connected data storage. In some embodiments, loading the client file comprises the operator of the device 200 identifying a file from a file location for use by the device 200 in the method 800. In some embodiments, the client file may identify that the client records included therein are to be confirmed and/or updated based on communications with the server 102 that occur via a phone menu accessed via a phone call. Alternatively, the client file may identify that the client records are to be confirmed and/or updated based on communications with the server via a website or other user interface. Additionally, the method 800 may involve identifying a first client record in the client file and set the first client record as a "current client record" for the method 800, at block 804.

The flowchart further includes block 806, at which the service provider system 106 may optionally upload a configuration file (for example, the configuration file 401) for use when navigating the phone menu for the server 102. Block 806 may be optional when a particular configuration file is associated with the client file loaded at block 804. In such instances, selection and uploading of the client file may automatically identify the appropriate configuration file to utilize with the client file. The configuration file, as introduced above, may include details for communicating with the server 102 and instructions for navigating the user interface for the server 102. For example, when the server 102 is accessed via the phone menu and the phone call, the configuration file may include one or more of the phone number to dial to access the phone menu of the server 102 and instructions for navigating the phone menu. Furthermore, block 806 may be optional when the device 200 utilizes the natural language processor 275 and the NLP process 501 of FIG. 5 to navigate the phone menu to contact the server 102.

At block 808, the service provider system 106 may call the phone number for the server 102 phone menu. In some instances, the phone number is identified in the configuration file (when loaded) or the client file. At block 808, the method 800 further navigates the phone menu, either based on the configuration file (when loaded) or using the NLP process 501. In some instances, this may effectively comprise the method 800 following the data flow 400 of FIG. 4 (when the configuration file is loaded at block 806) or following the data flow 500 of FIG. 5 (when the configuration file is not loaded and NLP is performed instead). In some instances, the block 808 involves navigating the phone menu as far as the prompt for the service provider system 106 to enter the client identifier or reference number.

At block 810, the service provider system 106 may enter the client identifier or reference number in response to the prompt and await the response message from the server 102 via the phone menu. When using the configuration file 401, the service provider system 106 may wait for a delay to expire (as defined by the configuration file 401). When using the NLP process 501, the service provider system 106 may await for the NLP process 501 to indicate that the response message is being provided. At block 812, the service provider system 106 obtains the response message from the server 102. When the server 102 is being access via the phone menu, the response message may be an audio message that the service provider system 106 records and/or stores for processing.

At block 814, the service provider system 106 identifies when processing the current client record being processed completes or results in an error. The service provider system 106 may determine that processing of the current client record completed when (1) the response message from the server 102 provides the corresponding client data and (2) the service provider system 106 completes comparing and/or updating the client data in the client record with the corresponding client data. The client data in the client record may be updated with the corresponding client data any time that the corresponding client data is different from the client data in the client record. When the client data is compared and/or updated for the current client record, then the service provider system 106 identifies the current client record as a completed record and increments a corresponding completed record counter. In some embodiments, the service provider system 106 can further identify any difference between the client data in the client record and the corresponding client data and determine whether the difference exceeds a threshold value (for example, stored in the database 108 or the configuration file. The service provider system 106 may further determine that, when the difference exceeds the threshold value, the client data has changed to a different level or value.

Alternatively, processing the current client record results in the error in any of the conditions identified above: (1) the value(s) entered into the phone menu (for example, at the option trees or in response to the prompt) are invalid, suggesting that the phone menu has changed; the client identifier or reference number entered (for example, as input at block 410 or block 510) is incorrect (for example, too short, too long, or not recognized as a valid client identifier or reference number; and (3) the client needs to speak with a representative or provide additional information before being given the corresponding client data. If the service provider system 106 identifies any of the errors for the current client record, then the service provider system 106 identifies the current client record as a record that resulted in an error and increments a corresponding record error counter.

At block 816, the service provider system 106 may dynamically generate and/or update a visual interface (for example, one or more screens or values displayed on one or more of the screenshots of FIGS. 9A-9D). For example, the service provider system 106 may generate the screenshots of FIGS. 9A-9D, which may include the completed record counter and record error counter. The service provider system 106 adjust information shown on the visual interface as the service provider system 106 identifies changes in the processed information.

At block 818, the service provider system 106 determines whether the client file includes additional client records for processing. If the client file does include additional client records, then the service provider system 106 increments the current client record to be set to a next client record in the client file at block 820. If, at block 818, the service provider system 106 determines that the client file does not include any additional client records, then the method 800 ends at 822.

Example Flowchart for Updating Files and Generating a User Interface Based on Data Obtained from the Phone Menu for a Server FIGS. 9A-9D are example screenshots of a user interface provided by the service provider system 106 that implements the flowcharts of FIGS. 4-5. In some aspects, the screenshots, in combination, represent progress through the data flow 400 where the client records in the client file are compared and/or updated based on corresponding client data received by navigating a phone menu using the configuration file 401.

Figure 9A:
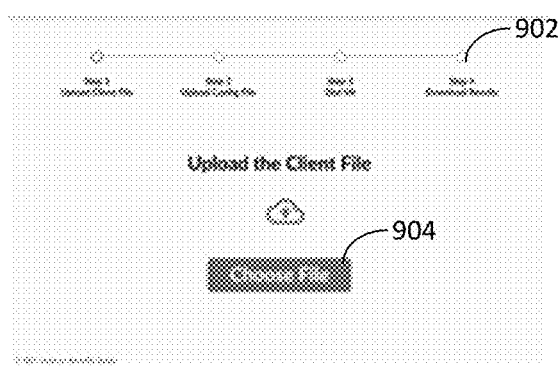
FIGS. 9A-9D are example screenshots of a user interface provided by the service provider system that implements the data flows of FIGS. 4-5.

Each of the screenshots in FIGS. 9A-9D include a progress bar 902 that tracks progress, for example, through completion of comparing and/or updating all client records in a client file. FIG. 9A provides a screenshot of the user interface having a choose client file button 904 that is operator accessible/selectable and that enables the operator of the service provider system 106 to choose the client file to upload. As described above, the operator can choose the client file from local storage, networked storage, and/or external storage. The client file may include all client records for which client data is to be compared and/or updated with corresponding client data from the server 102. FIG. 9A shows that the progress bar 902 is at the first step (i.e., uploading of the client file). Once the operator selects the client file to upload via the choose client file button 904, the user interface may update to show the screenshot of FIG. 9B.

Figure 9B:
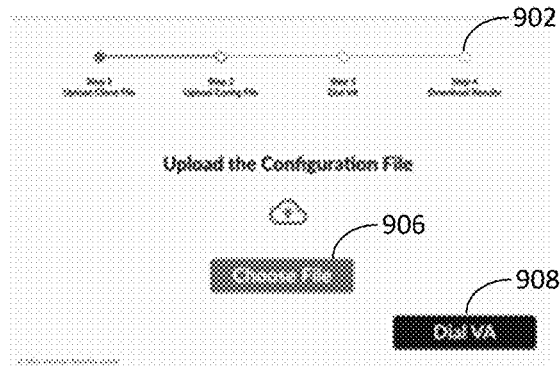

FIG. 9B provides a screenshot of the user interface having a choose configuration file button 906 that is operator accessible/selectable and that enables the operator of the service provider system 106 to choose the configuration file 401 to upload. The operator may select the configuration file 401 that is associated with the uploaded client file or that is associated with the server 102 with which the service provider system 106 will communicate to compare and/or update the client data in the client records. In some instances, the configuration file 401 may be the same for all client files or may be automatically associated with the uploaded client file such that a separate upload step is not required. FIG. 9B also includes an initiate the call button 908 that is operator accessible/selectable and that initiates the call to the server 102 when selected by the operator. FIG. 9B shows that the progress bar 902 is at the second step (i.e., uploading of the configuration file and initiating the call). Once the operator calls the server 102 via the initiate the call button 908, the user interface may update to show the screenshot of FIG. 9C.

Figure 9C:
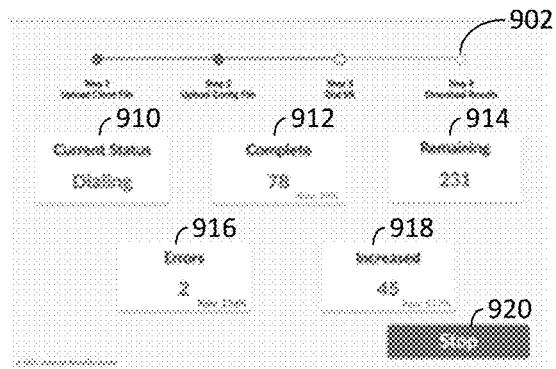

FIG. 9C provides a screenshot of a status of the comparison/updating of client data for the client records in the client file. FIG. 9C shows that the progress bar 902 is at the third step (i.e., calling the server 102 and processing client records). FIG. 9C also includes various information that the service provider system 106 dynamically updates while processing the client records in the client file.

For example, FIG. 9C includes a "Current Status" indicator 910, a "Completed" files indicator 912, a "Remaining" file indicator 914, an "Errors" indicator 916, and a "Changed" indicator 918. The "Current Status" indicator 910 identifies the status for the service provider system 106 when displaying the screenshot of FIG. 9C. Options for the indicator 910 may include "Dialing", "Navigating Menu", "Receiving Data", "Comparing Data", and "Complete" among other values. When the indicator 910 indicates "Dialing", the service provider system 106 may be calling the server 102. When the indicator 912 indicates "Navigating Menu", the service provider system 106 may be navigating the phone menu provided by the server 102. When the indicator 910 indicates "Receiving Data", the service provider system 106 may be receiving the response message from the server 102. When the indicator 910 indicates "Comparing Data", the service provider system 106 may be comparing the client data in the client record with the corresponding client data from the response message. When the indicator 910 indicates "Completed", the service provider system 106 may have completed processing the records in the uploaded client file.

In some instances, FIG. 9C includes a "Complete" indicator 912 that identifies a number of client records from the client file that the service provider system 106 finished processing at the time the service provider system 106 displays the screenshot of FIG. 9C. For example, the indicator 912 of FIG. 9C identifies that the service provider system 106 completed processing of 78 client records, which is approximately 34% of the total records in the client file (and to be processed).

FIG. 9C may also include a "Remaining" indicator 914 that identifies a number of client records remaining in the client file that the service provider system 106 must still process. For example, the indicator 914 of FIG. 9C indicates that there are 231 records remaining the client file when the service provider system 106 displays the screenshot of FIG. 9C. In some instances, FIG. 9C includes an "Errors" indicator 916 that identifies a number of client records from the client file for which the service provider system 106 identified an error at the time the service provider system 106 displays the screenshot of FIG. 9C. For example, the indicator 914 of FIG. 9C indicates that the service provider system 106 processed 2 client files that results in an error, which is approximately 2.56% of the client records processed to the point at which the service provider system 106 generated the screenshot of FIG. 9C. The FIG. 9C screenshot also includes a "Changed" indicator 918 that indicates how many processed client records have updated corresponding client data as compared to the client data in the client records. For example, the indicator 918 indicates that 45 of the 78 completed client records in the client file had client data that changed when compared with the corresponding client data from the server 102, which is approximately 57.7% of the completed records. The FIG. 9C screenshot may also include an operator accessible "Stop" button 920 that enables the operator to stop and/or pause the processing of the client file.

Figure 9D:
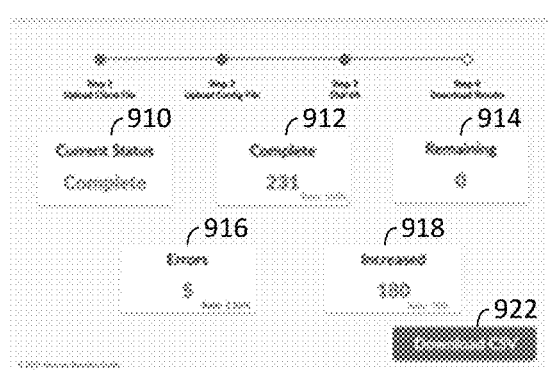

FIG. 9D provides a screenshot of a status of the comparison/updating of client data for the client records in the client file. FIG. 9D shows that the progress bar 902 is at the fourth and final step (i.e., accessing and/or downloading results). FIG. 9D also includes the various information introduced in FIG. 9C, but with final values instead of the current values when the service provider system 106 displayed FIG. 9C. For example, for FIG. 9D, the indicator 910 indicates "Complete", indicating that the service provider system 106 completed processing the records in the uploaded client file. Additionally, the "Complete" indicator 912 identifies that the service provider system 106 completed processing all 231 client records of the client file, which is 100% of the total records in the client file. FIG. 9D shows that the "Remaining" indicator 914 identifies that there are no remaining client records in the client file that the service provider system 106 must still process. Additionally, FIG. 9D includes the "Errors" indicator 916 identifying that the number of client records from the client file for which the service provider system 106 identified an error during processing is 5, which is approximately 2.86% of the total number of client records processed. The FIG. 9D screenshot also includes the "Changed" indicator 918 that indicates that 180 of the client records in the client file had client data that changed when compared with the corresponding client data from the server 102. Finally, FIG. 9D includes an operator accessible "Download" button 922 that enables the operator to download details of the changes to the client records in the client file and/or download the updated client file.

Figure 10:
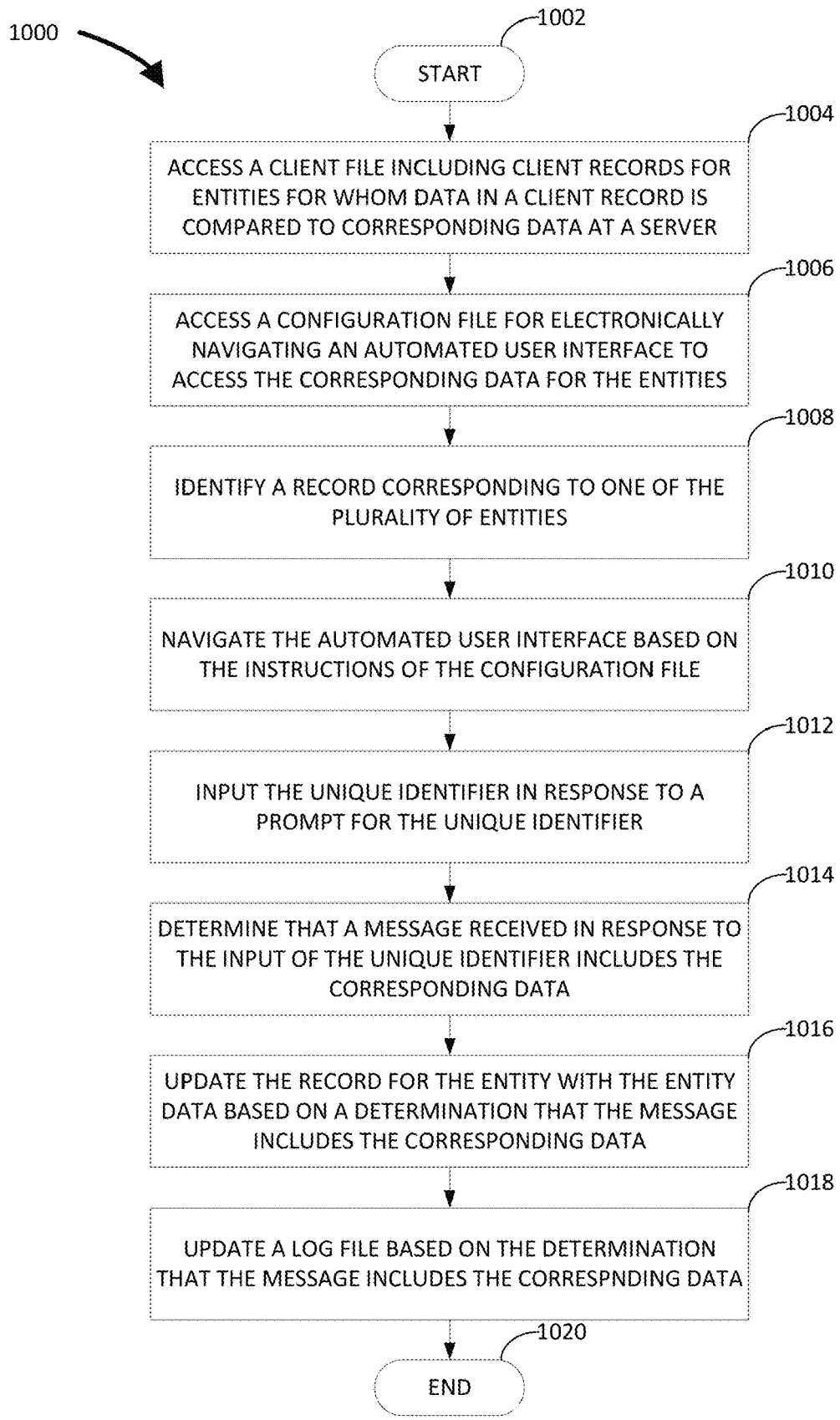
FIG. 10 depicts an example method for using an automated voice menu navigation system to update local records based on data from a remote server.

Example Method for Using an Automated Voice Menu Navigation System to Update Local Records Based on Data from a Remote Server FIG. 10 depicts an example method 1000 for using an automated voice menu navigation system to update local records based on data from a remote server. The service provider system 106 of FIGS. 1A and 1B may perform the method 1000, for example, when the device 200 of FIG. 2 implements the service provider system 106.

Method 1000 begins at step 1002 with accessing a client file including client records for entities for whom data in a client record is compared to corresponding data at a server (for example, the server 102). In some embodiments, the client file includes a plurality of records for a plurality of entities and the corresponding data at the server is obtained or access via an automated user interface provided by the server. In some embodiments, the client records in the client file each includes a unique identifier corresponding to or associated with the data in the corresponding client record. The unique identifier may correspond to the client identifier or reference number that is provided to the server 102 via the user interface provided by the server to obtain the corresponding data from the server 102 for comparison to the data in the client record. In some embodiments, the entity corresponds to a client on behalf of whom the service provider system 106 is accessing the server 102. In some embodiments, the accessed entity file will be loaded into memory, for example the main memory 215 or secondary memory 220 of the device 200. In various embodiments, the service provider system 106 accesses the configuration filed from the database 108.

Method 1000 then proceeds to step 1006 with accessing a configuration file comprising instructions for electronically navigating the automated user interface to access the corresponding data for the entities. In some embodiments, the accessed configuration file will be loaded into memory, for example the main memory 215 or secondary memory 220 of the device 200. In some instances, the step 1006 is optional, for example, when accessing the client file corresponds to accessing a corresponding or associated configuration file. In various embodiments, the service provider system 106 accesses the configuration filed from the database 108.

Method 1000 then proceeds to step 1008 with identifying a client record corresponding to one of the plurality of entities. Each client record in the client file may be processed individually. This means that the service provider system 106 may contact the server 102 on behalf of each client individually and obtain the corresponding data for that individual client independent of requests for corresponding data for other clients. However, the service provider system 106 may direct requests for the corresponding data for multiple clients to the server 102 at once in parallel with each other. Furthermore, the method 1000 may be completed for each record in the client file. For example, various steps of the method 1000 may be repeated for each client record in the client file.

Method 1000 then proceeds to step 1010 with navigating the automated user interface based on the instructions of the configuration file. In some embodiments, the method 1000 may utilize the configuration file 401 to navigate the automated user interface provided by the server 102, for example, as described above in relation to data flow 400 of FIG. 4. In some embodiments, the user interface is a phone menu accessed via a phone call or similar communication. Alternatively, the user interface may comprise a web site or online portal.

Method 1000 then proceeds to step 1012 with inputting the unique identifier in response to a prompt for the unique identifier. For example, as described above, navigating the user interface will result in arriving at the prompt from the server for the client's identifier or reference number. The client identifier or reference number may correspond to the unique identifier in the client record identified in step 1008.

Method 1000 then proceeds to step 1014 with determining that a message received in response to the input of the unique identifier includes the corresponding data. In some embodiments, determining whether the message includes the corresponding data comprises converting the received message into an interpretable or understandable format and parsing the received message, as described above with reference to the data flow 400 of FIG. 4. In some embodiments, the method 1000 further determines that the message received in response to the input of the unique identifier indicates an error occurred.

Method 1000 then proceeds to step 1016 with updating the record for the entity with the corresponding data based on a determination that the message includes the corresponding data. In some embodiments, the step 1016 may follow comparison of the data in the client record with the corresponding data received from the server. When the comparison identifies a change, then the data in the client record may be updated with the corresponding data as that data was received most recently.

Method 1000 then proceeds to step 1018 with updating a log file based on a determination that the message includes the corresponding data. In some embodiments, the method 1000 may optionally update the log file based on a determination that the message indicates the error accessing the corresponding data via the automated user interface and identify what error occurred, for example, an error navigating the user interface, an error with the unique identifier, or another error. In some instances, the client record may be updated with the error information for transaction history purposes.

As introduced above, the method 1000 may generally be performed repeatedly or iteratively for each client record in the client file. Specifically, the steps 1008-1018 may be repeated for each client record in the client file.

Notably, FIG. 10 is just one example method, and other methods having additional steps, different steps, and/or fewer steps are possible consistent with the various embodiments described herein.

Example Clauses

Implementation examples are described in the following numbered clauses:

Clause 1: A system for obtaining electronic data from a server accessible via a telecommunications network, the system comprising: a communication device configured to electronically access an automated phone system via the telecommunications network using a telephone number; a memory circuit configured to store a configuration file comprising instructions for electronically navigating a phone menu of the automated phone system and a log file comprising details of transactions with the automated phone system; and a processor configured to: identify a record corresponding to an entity, the record including a unique identifier for the entity and data to be compared with corresponding data accessible via the automated phone system; access the phone menu of the automated phone system via the communication device using the telephone number; navigate the phone menu based on the configuration file and via the communication device; input, via the communication device, a unique sequence of digits corresponding to the unique identifier in response to a prompt for the unique identifier from the automated phone system and based on the instructions in the configuration file; obtain an audio message from the automated phone system in response to the input of the unique sequence of digits; convert the audio message to a corresponding text message; determine that the corresponding text message includes the corresponding data; update the identified record with the corresponding text message based on a determination that the corresponding text message includes the corresponding data; and update the log file based on the determination that the corresponding text message includes the corresponding data.

Clause 2: The system of Clause 1, wherein the hardware controller is further configured to: compare the corresponding data and the data in the record; identify a difference between the corresponding data and the data in the record that exceeds a threshold value identified in the configuration file; and determine a change in a scope of benefits of the entity when the difference exceeds the threshold value.

Clause 3: The system of Clause 2, wherein the hardware controller is further configured to: identify a company value corresponding to the determined change; and store the difference, the determined change, and the company value in a data store.

Clause 4: The system of any one of Clauses 1-3, wherein the hardware controller is further configured to, based on the update to the log file indicating the error accessing the corresponding data via the automated phone system: access the automated phone system with natural language processing via a natural language processing component; generate a map of the phone menu based on accessing the automated phone system via the natural language processing component; and update the configuration file with updated instructions for navigating the phone menu and inputting the unique sequence of digits based on the generated map of the phone menu.

Clause 5: The system of Clause 4, wherein the natural language processing component is configured to: process prompts of the phone menu; and identify options available for responding to the prompts, wherein the hardware controller is configured to generate the map of the phone system based on the processing of the prompts and the identified options for responding to the prompts.

Clause 6: The system of any one of Clauses 1-5, further comprising: a data store configured to store a plurality of records for a plurality of corresponding entities including the entity, wherein the hardware controller is further configured to navigate the phone menu and obtain an audio message for each record and corresponding entity of the plurality of records and entities.

Clause 7: The system of Clause 6, wherein the communication device is further configured to: dial the telephone number to access the automated phone system; and disconnect from the automated phone system after obtaining the audio message for each record of the plurality of records.

Clause 8: The system of Clause 7, wherein the communication device is further configured to, for each respective record of the plurality of records: dial the telephone number; access the automated phone system for the corresponding entity; and disconnect from the automated phone system.

Clause 9: The system of any one of Clauses 7 and 8, wherein the communication device is further configured to, for each respective record of the plurality of records: maintain a connection with the automated phone system; and access the automated phone system for the corresponding entity before disconnecting from the automated phone system.

Clause 10: The system of any one of Clauses 7-9, wherein the log file includes, for individual communication connections with the automated phone system: a time and date when the communication device dials the telephone number to initiate the connection with the automated phone system; a time when the communication device terminates the connection with the automated phone system; and an identifier for each entity whose entity information was attempted to be compared with the corresponding data during the connection and a corresponding positive result indicator or negative result indicator, wherein the positive result indicator indicates the determination that the corresponding text message includes the corresponding data for the entity, and wherein the negative result indicator indicates the determination that the corresponding text message indicates the error accessing the corresponding data for the entity.

Clause 11: The system of any one of Clauses 6-10, wherein the communication device and the hardware controller are further configured to access the automated phone system for multiple of the plurality of records in parallel.

Clause 12: The system of any one of Clauses 1-11, wherein the instructions in the configuration file include: identification of one or more numbers to enter into the phone menu in response to prompts; delays to observe when navigating the phone menu; and identification of available options when navigating the phone menu.

Clause 13: A method of obtaining electronic data, the method comprising: accessing a client file, the client file comprising a plurality of client records for a plurality of entities for whom respective data in the respective client record is compared to corresponding data from a server; accessing a configuration file comprising instructions for electronically navigating an automated user interface for the server to access the corresponding data for the plurality of entities; identifying a record corresponding to one of the plurality of entities, the record including a unique identifier for the entity and the data to be compared with the corresponding data accessed via the automated user interface; navigating the automated user interface based on the instructions of the configuration file via a communication device; inputting the unique identifier in response to a prompt for the unique identifier from the automated user interface via the communication device; determining that a message received in response to the input of the unique identifier includes the corresponding data; updating the record for the entity with the corresponding data based on a determination that the message includes the corresponding data; and updating a log file based on the determination that the message includes the corresponding data.

Clause 14: The method of Clause 13, wherein the automated user interface comprises an automated phone system and wherein the instructions comprise instructions for navigating a phone menu of the automated phone system.

Clause 15: The method of any one of Clauses 13 and 14, wherein the unique identifier comprises a unique sequence of alphanumeric characters.

Clause 16: The method of any one of Clauses 13-15, further comprising: comparing the data and the corresponding data in the record; identifying a difference between the data and the corresponding data in the record that exceeds a threshold value identified in the configuration file; and determining a change in a scope of benefits of the entity when the difference exceeds the threshold value.

Clause 17: The method of any one of Clauses 13-16, further comprising, based on updating the log file based on the determination that the message indicates the error accessing the corresponding data: accessing the automated user interface with natural language processing via a natural language processing component; generating a map for navigating the automated user interface based on accessing the automated phone system via the natural language processing component; and updating the configuration file with updated instructions for: electronically navigating the automated user interface; and inputting the unique sequence of digits based on the generated map.

Clause 18: The method of Clause 17, further comprising: processing prompts of the automated user interface; and identifying options available for responding to the prompts, wherein generating the map of the automated user interface comprises generating the map based on the processing of the prompts and the identified options for responding to the prompts.

Clause 19: The method of any one of Clauses 13-18, wherein the instructions in the configuration file include: identification of one or more responses to enter into the automated user interface in response to prompts; and delays to observe when navigating the automated user interface; and identification of available options when navigating the automated user interface.

Clause 20: A system for obtaining electronic data from a server accessible via a telecommunications network, the system comprising: a communication device configured to electronically access an automated user interface via the telecommunications network using a communication identifier; a memory circuit configured to store a log file comprising details of transactions with the automated user interface and a plurality of records corresponding to a plurality of entities, individual records of the plurality of records including a unique identifier for the corresponding entity and data to be compared with corresponding data accessible via the automated user interface; and a processor configured to: identify a record from the plurality of records comprising the data for comparison with the corresponding data accessible via the automated user interface; dynamically navigate the automated user interface via the communication device; automatically input, via the communication device, an alphanumeric sequence of characters representing the unique identifier in response to a prompt for the unique identifier from the automated user interface; determine that a message received in response to the input of the alphanumeric sequence of characters includes the corresponding data; update the record for the entity with the corresponding data based on a determination that the message includes the corresponding data; and update a log file based on the determination that the message includes the corresponding data.

Clause 21: A processing system, comprising: a memory comprising computer-executable instructions; one or more processors configured to execute the computer-executable instructions and cause the processing system to perform a method in accordance with any one of Claims 1-20.

Clause 22: A processing system, comprising means for performing a method in accordance with any one of Claims 1-20.

Clause 23: A non-transitory computer-readable medium comprising computer-executable instructions that, when executed by one or more processors of a processing system, cause the processing system to perform a method in accordance with any one of Claims 1-20.

Clause 24: A computer program product embodied on a computer-readable storage medium comprising code for performing a method in accordance with any one of Clauses 1-20.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for obtaining electronic data from a server accessible via a telecommunications network, the system comprising:
- a communication device configured to electronically access an automated phone system via the telecommunications network using a telephone number;
- a memory circuit configured to store a configuration file comprising instructions for electronically navigating a phone menu of the automated phone system and a log file comprising details of transactions with the automated phone system; and
- a processor configured to:
  - identify a record corresponding to an entity, the record including a unique identifier for the entity and data to be compared with corresponding data accessible via the automated phone system;
  - access the phone menu of the automated phone system via the communication device using the telephone number;
  - navigate the phone menu based on the configuration file and via the communication device;
  - input, via the communication device, a unique sequence of digits corresponding to the unique identifier in response to a prompt for the unique identifier from the automated phone system and based on the instructions in the configuration file;
  - obtain an audio message from the automated phone system in response to the input of the unique sequence of digits;
  - convert the audio message to a corresponding text message;
  - determine that the corresponding text message includes the corresponding data;
  - compare the corresponding data and the data in the record;
  - identify a difference between the corresponding data and the data in the record that exceeds a threshold value identified in the configuration file;
  - determine a change in a scope of benefits of the entity when the difference exceeds the threshold value;
  - identify a company value corresponding to the determined change;
  - update the identified record with the corresponding text message, the difference, the determined change, and the company value based on a determination that the corresponding text message includes the corresponding data; and
  - update the log file based on the determination that the corresponding text message includes the corresponding data.

2. The system of claim 1, wherein the processor is further configured to, based on the update to the log file indicating an error accessing the corresponding data via the automated phone system:
- access the automated phone system with natural language processing via a natural language processing component;
- generate a map of the phone menu based on accessing the automated phone system via the natural language processing component; and
- update the configuration file with updated instructions for navigating the phone menu and inputting the unique sequence of digits based on the generated map of the phone menu.

3. The system of claim 2, wherein the natural language processing component is configured to:
- process prompts of the phone menu; and
- identify options available for responding to the prompts,
- wherein the processor is configured to generate the map of the phone system based on the processing of the prompts and the identified options for responding to the prompts.

4. The system of claim 1, further comprising:
- a data store configured to store a plurality of records for a plurality of corresponding entities including the entity,
- wherein the processer is further configured to navigate the phone menu and obtain an audio message for each record and corresponding entity of the plurality of records and entities.

5. The system of claim 4, wherein the communication device is further configured to:
- dial the telephone number to access the automated phone system; and
- disconnect from the automated phone system after obtaining the audio message for each record of the plurality of records.

6. The system of claim 5, wherein the communication device is further configured to, for each respective record of the plurality of records:
- dial the telephone number;
- access the automated phone system for the corresponding entity; and
- disconnect from the automated phone system.

7. The system of claim 5, wherein the communication device is further configured to, for each respective record of the plurality of records:
- maintain a connection with the automated phone system; and
- access the automated phone system for the corresponding entity before disconnecting from the automated phone system.

8. The system of claim 5, wherein the log file includes, for individual communication connections with the automated phone system:
- a time and date when the communication device dials the telephone number to initiate the connection with the automated phone system;
- a time when the communication device terminates the connection with the automated phone system; and
- an identifier for each entity whose entity information was attempted to be compared with the corresponding data during the connection and a corresponding positive result indicator or negative result indicator,
- wherein the positive result indicator indicates the determination that the corresponding text message includes the corresponding data for the entity, and
- wherein the negative result indicator indicates the determination that the corresponding text message indicates an error accessing the corresponding data for the entity.

9. The system of claim 4, wherein the communication device and the processor are further configured to access the automated phone system for multiple of the plurality of records in parallel.

10. The system of claim 1, wherein the instructions in the configuration file include:
- identification of one or more numbers to enter into the phone menu in response to prompts;
- delays to observe when navigating the phone menu; and
- identification of available options when navigating the phone menu.

11. A method of obtaining electronic data, the method comprising:

accessing a client file, the client file comprising a plurality of client records for a plurality of entities for whom respective data in the respective client record is compared to corresponding data from a server;
accessing a configuration file comprising instructions for electronically navigating an automated user interface for the server to access the corresponding data for the plurality of entities;
identifying a record corresponding to one of the plurality of entities, the record including a unique identifier for the entity and the data to be compared with the corresponding data accessed via the automated user interface;
navigating the automated user interface based on the instructions of the configuration file via a communication device;
inputting the unique identifier in response to a prompt for the unique identifier from the automated user interface via the communication device;
determining that a message received in response to the input of the unique identifier includes the corresponding data;
comparing the corresponding data and the data in the record;
identifying a difference between the corresponding data and the data in the record that exceeds a threshold value identified in the configuration file;
determining a change in a scope of benefits of the entity when the difference exceeds the threshold value;
identifying a company value corresponding to the determined change;
updating the record for the entity with the corresponding data, the difference, the determined change, and the company value based on a determination that the message includes the corresponding data; and
updating a log file based on the determination that the message includes the corresponding data.

12. The method of claim 11, wherein the automated user interface comprises an automated phone system and wherein the instructions comprise instructions for navigating a phone menu of the automated phone system.

13. The method of claim 12, further comprising navigating the phone menu and obtaining an audio message for each record and corresponding entity of the plurality of records and entities.

14. The method of claim 12, further comprising:
dialing a telephone number associated with the automated phone system;
accessing the automated phone system for the corresponding entity; and
disconnecting from the automated phone system.

15. The method of claim 12, wherein the log file includes, for individual communication connections with the automated phone system:
a time and date when the communication device dials a telephone number to initiate the connection with the automated phone system;
a time when the communication device terminates the connection with the automated phone system; and
an identifier for each entity whose entity information was attempted to be compared with the corresponding data during the connection and a corresponding positive result indicator or negative result indicator,
wherein the positive result indicator indicates the determination that the corresponding message includes the corresponding data for the entity, and
wherein the negative result indicator indicates the determination that the corresponding message indicates an error accessing the corresponding data for the entity.

16. The method of claim 11, wherein the unique identifier comprises a unique sequence of alphanumeric characters.

17. The method of claim 11, further comprising, based on updating the log file based on the determination that the message indicates n error accessing the corresponding data:
accessing the automated user interface with natural language processing via a natural language processing component;
generating a map for navigating the automated user interface based on accessing an automated phone system via the natural language processing component; and
updating the configuration file with updated instructions for:
electronically navigating the automated user interface; and
inputting a unique sequence of digits based on the generated map.

18. The method of claim 17, further comprising:
processing prompts of the automated user interface; and
identifying options available for responding to the prompts,
wherein generating the map of the automated user interface comprises generating the map based on the processing of the prompts and the identified options for responding to the prompts.

19. The method of claim 11, wherein the instructions in the configuration file include:
identification of one or more responses to enter into the automated user interface in response to prompts; and
delays to observe when navigating the automated user interface; and
identification of available options when navigating the automated user interface.

20. A system for obtaining electronic data from a server accessible via a telecommunications network, the system comprising:
a communication device configured to electronically access an automated user interface via the telecommunications network using a communication identifier;
a memory circuit configured to store a log file comprising details of transactions with the automated user interface and a plurality of records corresponding to a plurality of entities, individual records of the plurality of records including a unique identifier for the corresponding entity and data to be compared with corresponding data accessible via the automated user interface; and
a processor configured to:
identify a record from the plurality of records comprising the data for comparison with the corresponding data accessible via the automated user interface;
dynamically navigate the automated user interface via the communication device;
automatically input, via the communication device, an alphanumeric sequence of characters representing the unique identifier in response to a prompt for the unique identifier from the automated user interface;
determine that a message received in response to the input of the alphanumeric sequence of characters includes the corresponding data;
compare the corresponding data and the data in the record;

identify a difference between the corresponding data and the data in the record that exceeds a threshold value;
determine a change in a scope of benefits of the entity when the difference exceeds the threshold value;
identify a company value corresponding to the determined change;
update the identified record with the corresponding text message, the difference, the determined change, and the company value based on a determination that the message includes the corresponding data; and
update the log file based on the determination that the message includes the corresponding data.

\* \* \* \* \*